(12) United States Patent
Papakostas et al.

(10) Patent No.: US 9,736,136 B2
(45) Date of Patent: *Aug. 15, 2017

(54) SYSTEMS, METHODS, AND APPARATUS TO MONITOR MOBILE INTERNET ACTIVITY

(71) Applicant: The Nielsen Company (US), LLC, Schaumburg, IL (US)

(72) Inventors: Achilleas Papakostas, Dallas, TX (US); Michael Andrew Yonker, Dallas, TX (US)

(73) Assignee: The Nielsen Company (US), LLC, New York, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/537,484

(22) Filed: Nov. 10, 2014

(65) Prior Publication Data

US 2015/0058958 A1  Feb. 26, 2015

Related U.S. Application Data

(63) Continuation of application No. 12/856,643, filed on Aug. 14, 2010, now Pat. No. 8,910,259.

(51) Int. Cl.
*H04L 29/06* (2006.01)
*H04W 12/06* (2009.01)
(Continued)

(52) U.S. Cl.
CPC .......... *H04L 63/08* (2013.01); *H04L 63/0281* (2013.01); *H04L 63/10* (2013.01);
(Continued)

(58) Field of Classification Search
CPC ..... H04L 63/08; H04L 63/10; H04L 63/0281; H04L 67/2814; G06Q 30/02; H04W 12/06
See application file for complete search history.

(56) References Cited

U.S. PATENT DOCUMENTS

| 4,355,372 A | 10/1982 | Johnson et al. |
|---|---|---|
| RE31,951 E | 7/1985 | Johnson et al. |

(Continued)

FOREIGN PATENT DOCUMENTS

| CA | 2781018 | 12/2012 |
|---|---|---|
| CN | 10909739 | 2/2007 |

(Continued)

OTHER PUBLICATIONS

Canadian Patent Office, "Office Action" issued in connection with Canadian Patent Application No. 2,749,013, dated Oct. 6, 2015 (4 pages).

(Continued)

*Primary Examiner* — Beemnet Dada
(74) *Attorney, Agent, or Firm* — Hanley, Flight & Zimmerman, LLC

(57) ABSTRACT

Systems, methods, and apparatus to monitor mobile Internet activity are disclosed. An example method comprises determining if a media request originated from a desktop computer or a mobile device by inspecting a user agent identifier of the media request. The media request is blocked if the media request originated from the desktop computer, the blocking to prevent the media request originating from the desktop computer from affecting a media exposure monitoring result. If the media request originated from the mobile device, an identifier of the media requested by the media request in association with the mobile device is stored.

20 Claims, 9 Drawing Sheets

(51) Int. Cl.
*H04L 29/08* (2006.01)
*G06Q 30/02* (2012.01)

(52) U.S. Cl.
CPC ........ *H04L 67/2814* (2013.01); *H04W 12/06* (2013.01); *G06Q 30/02* (2013.01)

(56) References Cited

U.S. PATENT DOCUMENTS

| | | |
|---|---|---|
| 4,603,232 A | 7/1986 | Kurland et al. |
| 4,954,699 A | 9/1990 | Coffey et al. |
| 4,958,284 A | 9/1990 | Bishop et al. |
| 5,023,929 A | 6/1991 | Call |
| 5,060,140 A | 10/1991 | Brown et al. |
| 5,481,294 A | 1/1996 | Thomas et al. |
| 5,488,408 A | 1/1996 | Maduzia et al. |
| 5,497,185 A | 3/1996 | Dufresne et al. |
| 5,526,427 A | 6/1996 | Thomas et al. |
| 5,550,928 A | 8/1996 | Lu et al. |
| 5,557,686 A | 9/1996 | Brown et al. |
| 5,584,050 A | 12/1996 | Lyons |
| 5,594,934 A | 1/1997 | Lu et al. |
| 5,659,469 A | 8/1997 | Deaton et al. |
| 5,675,510 A | 10/1997 | Coffey et al. |
| 5,689,799 A | 11/1997 | Dougherty et al. |
| 5,710,887 A | 1/1998 | Chelliah et al. |
| 5,715,399 A | 2/1998 | Bezos |
| 5,732,218 A | 3/1998 | Bland et al. |
| 5,737,025 A | 4/1998 | Dougherty et al. |
| 5,737,026 A | 4/1998 | Lu et al. |
| 5,751,450 A | 5/1998 | Robinson |
| 5,771,307 A | 6/1998 | Lu et al. |
| 5,781,913 A | 7/1998 | Felsenstein et al. |
| 5,790,875 A | 8/1998 | Andersin et al. |
| 5,848,396 A | 12/1998 | Gerace |
| 5,850,249 A | 12/1998 | Massetti et al. |
| 5,862,325 A | 1/1999 | Reed et al. |
| 5,872,850 A | 2/1999 | Klein et al. |
| 5,887,140 A | 3/1999 | Itsumi et al. |
| 5,889,548 A | 3/1999 | Chan |
| 5,961,593 A | 10/1999 | Gabber et al. |
| 5,970,469 A | 10/1999 | Scroggie et al. |
| 5,991,735 A | 11/1999 | Gerace |
| 6,006,260 A | 12/1999 | Barrick, Jr. et al. |
| 6,026,367 A | 2/2000 | Hjelmvik |
| 6,026,368 A | 2/2000 | Brown et al. |
| 6,052,730 A | 4/2000 | Felciano et al. |
| 6,055,573 A | 4/2000 | Gardenswartz et al. |
| 6,058,381 A | 5/2000 | Nelson |
| 6,070,145 A | 5/2000 | Pinsley et al. |
| 6,070,148 A | 5/2000 | Mori et al. |
| 6,081,900 A | 6/2000 | Subramaniam et al. |
| 6,115,680 A | 9/2000 | Coffee et al. |
| 6,128,624 A | 10/2000 | Papierniak et al. |
| 6,138,162 A | 10/2000 | Pistriotto et al. |
| 6,138,165 A | 10/2000 | Nakatsugawa |
| 6,141,686 A | 10/2000 | Jackowski et al. |
| 6,151,593 A | 11/2000 | Cho et al. |
| 6,286,043 B1 | 9/2001 | Cuomo et al. |
| 6,286,046 B1 | 9/2001 | Bryant |
| 6,321,336 B1 | 11/2001 | Applegate et al. |
| 6,351,467 B1 | 2/2002 | Dillon |
| 6,381,632 B1 | 4/2002 | Lowell |
| 6,421,733 B1 | 7/2002 | Tso et al. |
| 6,449,251 B1 | 9/2002 | Awadallah et al. |
| 6,487,538 B1 | 11/2002 | Gupta et al. |
| 6,507,589 B1 | 1/2003 | Ramasubramani et al. |
| 6,567,857 B1 | 5/2003 | Gupta et al. |
| 6,606,581 B1 | 8/2003 | Nickerson et al. |
| 6,658,414 B2 | 12/2003 | Bryan et al. |
| 6,704,787 B1 | 3/2004 | Umbreit |
| 6,839,680 B1 | 1/2005 | Liu et al. |
| 6,856,963 B1 | 2/2005 | Hurwitz |
| 6,865,613 B1 | 3/2005 | Millet et al. |
| 6,993,590 B1 | 1/2006 | Gauthier et al. |
| 7,003,555 B1 | 2/2006 | Jungck |
| 7,039,599 B2 | 5/2006 | Merriman et al. |
| 7,065,505 B2 | 6/2006 | Stefik et al. |
| 7,080,077 B2 | 7/2006 | Ramamurthy et al. |
| 7,092,926 B2 | 8/2006 | Cerrato |
| 7,092,942 B2 | 8/2006 | Frieden et al. |
| 7,159,023 B2 | 1/2007 | Tufts |
| 7,181,412 B1 | 2/2007 | Fulgoni et al. |
| 7,200,632 B1 | 4/2007 | Greschler et al. |
| 7,216,149 B1 | 5/2007 | Briscoe et al. |
| 7,260,837 B2 | 8/2007 | Abraham et al. |
| 7,277,915 B2 | 10/2007 | De Boor et al. |
| 7,366,724 B2 | 4/2008 | Frieden et al. |
| 7,375,641 B2 | 5/2008 | Kiel et al. |
| 7,376,722 B1 | 5/2008 | Sim et al. |
| 7,526,538 B2 | 4/2009 | Wilson |
| 7,584,423 B2 | 9/2009 | Rohrabaugh et al. |
| 7,606,897 B2 | 10/2009 | Izrailevsky et al. |
| 7,613,809 B2 | 11/2009 | Jackson et al. |
| 7,688,813 B2 | 3/2010 | Shin et al. |
| 7,695,879 B2 | 4/2010 | Vanbesien et al. |
| 7,814,483 B2 | 10/2010 | Li et al. |
| 7,849,502 B1 | 12/2010 | Bloch et al. |
| 8,086,219 B2 | 12/2011 | O'Neil et al. |
| 8,285,218 B2 | 10/2012 | Papakostas et al. |
| 8,307,006 B2 | 11/2012 | Hannan et al. |
| 8,340,711 B1 | 12/2012 | Glass et al. |
| 8,594,617 B2 | 11/2013 | Papakostas et al. |
| 8,635,129 B2 | 1/2014 | Story et al. |
| 8,755,511 B2 | 6/2014 | Duva et al. |
| 8,886,773 B2 | 11/2014 | Papakostas et al. |
| 8,910,259 B2 | 12/2014 | Papakostas et al. |
| 9,301,173 B2 | 3/2016 | Papakostas |
| 9,307,418 B2 | 4/2016 | Papakostas et al. |
| 2001/0014915 A1 | 8/2001 | Blumenau |
| 2001/0020242 A1 | 9/2001 | Gupta et al. |
| 2002/0069368 A1 | 6/2002 | Hines |
| 2002/0077903 A1 | 6/2002 | Feldman et al. |
| 2002/0116523 A1 | 8/2002 | Warrier et al. |
| 2002/0128803 A1 | 9/2002 | Skinner et al. |
| 2002/0144156 A1 | 10/2002 | Copeland, III |
| 2002/0169830 A1 | 11/2002 | Mild et al. |
| 2002/0178257 A1 | 11/2002 | Cerrato |
| 2003/0009762 A1 | 1/2003 | Hooper et al. |
| 2003/0018778 A1 | 1/2003 | Martin et al. |
| 2003/0033432 A1 | 2/2003 | Simpson et al. |
| 2003/0035409 A1 | 2/2003 | Wang et al. |
| 2003/0051052 A1 | 3/2003 | Shteyn et al. |
| 2003/0065595 A1 | 4/2003 | Anglum |
| 2003/0076305 A1 | 4/2003 | Allen |
| 2003/0091025 A1 | 5/2003 | Celi, Jr. et al. |
| 2003/0154306 A1 | 8/2003 | Perry |
| 2003/0195884 A1 | 10/2003 | Boyd et al. |
| 2004/0133687 A1 | 7/2004 | Yamaguchi et al. |
| 2004/0205159 A1 | 10/2004 | Johnson et al. |
| 2005/0021603 A1 | 1/2005 | Yokomitsu et al. |
| 2005/0108539 A1 | 5/2005 | Skog et al. |
| 2005/0138192 A1 | 6/2005 | Encarnacion et al. |
| 2005/0198261 A1 | 9/2005 | Durvasula et al. |
| 2005/0201357 A1 | 9/2005 | Poyhonen |
| 2006/0133332 A1 | 6/2006 | Achanta |
| 2006/0258341 A1 | 11/2006 | Miller et al. |
| 2006/0264202 A1 | 11/2006 | Hagmeier et al. |
| 2007/0073625 A1 | 3/2007 | Shelton |
| 2007/0123760 A1 | 5/2007 | Scholler et al. |
| 2007/0214501 A1 | 9/2007 | Muramoto et al. |
| 2007/0222598 A1 | 9/2007 | Kiel et al. |
| 2007/0274211 A1 | 11/2007 | Tsubota |
| 2008/0005736 A1 | 1/2008 | Apacible et al. |
| 2008/0056261 A1 | 3/2008 | Osborn et al. |
| 2008/0289010 A1 | 11/2008 | Frieden et al. |
| 2009/0034536 A1 | 2/2009 | Morand et al. |
| 2009/0036108 A1 | 2/2009 | Cho |
| 2009/0089356 A1 | 4/2009 | Murray et al. |
| 2009/0106035 A1 | 4/2009 | Xu et al. |
| 2009/0233633 A1 | 9/2009 | Morrison |
| 2009/0282471 A1 | 11/2009 | Green et al. |
| 2009/0285118 A1 | 11/2009 | Yoshikawa et al. |
| 2009/0296917 A1 | 12/2009 | Nogawa |
| 2009/0320123 A1 | 12/2009 | Yu et al. |

(56) References Cited

U.S. PATENT DOCUMENTS

| | | |
|---|---|---|
| 2010/0036969 A1 | 2/2010 | Perry et al. |
| 2010/0095215 A1 | 4/2010 | Elven |
| 2010/0191947 A1 | 7/2010 | Shin |
| 2010/0205029 A1 | 8/2010 | Asherman et al. |
| 2010/0205617 A1 | 8/2010 | Hogan et al. |
| 2010/0216434 A1 | 8/2010 | Marcellino et al. |
| 2010/0293610 A1 | 11/2010 | Beachem et al. |
| 2011/0047254 A1 | 2/2011 | Vainionpää et al. |
| 2012/0042005 A1 | 2/2012 | Papakostas et al. |
| 2012/0042367 A1 | 2/2012 | Papakostas et al. |
| 2012/0158908 A1 | 6/2012 | Luna et al. |
| 2012/0210321 A1 | 8/2012 | Silva et al. |
| 2012/0216063 A1 | 8/2012 | Ogata |
| 2012/0235930 A1 | 9/2012 | Lazaridis et al. |
| 2012/0295581 A1 | 11/2012 | Agarwal |
| 2013/0005296 A1 | 1/2013 | Papakostas et al. |
| 2013/0006708 A1 | 1/2013 | Lee |
| 2013/0031599 A1 | 1/2013 | Luna et al. |
| 2013/0035059 A1 | 2/2013 | Liu et al. |
| 2013/0054402 A1 | 2/2013 | Asherman et al. |
| 2013/0064109 A1 | 3/2013 | Combet et al. |
| 2013/0066875 A1 | 3/2013 | Combet et al. |
| 2013/0183926 A1 | 7/2013 | Lindberg et al. |
| 2013/0276129 A1 | 10/2013 | Nelson et al. |
| 2013/0281050 A1 | 10/2013 | Agarwal et al. |
| 2014/0036687 A1 | 2/2014 | Papakostas et al. |
| 2014/0273923 A1 | 9/2014 | Papakostas |
| 2014/0280896 A1 | 9/2014 | Papakostas et al. |
| 2015/0058958 A1 | 2/2015 | Papakostas et al. |
| 2015/0067162 A1 | 3/2015 | Papakostas et al. |
| 2016/0127488 A1 | 5/2016 | Papakostas et al. |

FOREIGN PATENT DOCUMENTS

| | | |
|---|---|---|
| CN | 10159443 | 12/2009 |
| CN | 101605030 | 12/2009 |
| CN | 102377616 | 3/2012 |
| CN | 102917003 | 2/2013 |
| CN | 105025081 | 11/2015 |
| EP | 1980950 | 10/2008 |
| EP | 2079256 | 7/2009 |
| EP | 2341437 | 7/2011 |
| EP | 2549713 | 1/2013 |
| GB | 2437842 | 11/2007 |
| JP | 2003219467 | 7/2003 |
| JP | 2004342080 | 12/2004 |
| JP | 2005115473 | 4/2005 |
| JP | 2006044820 | 4/2006 |
| JP | 2007200209 | 8/2007 |
| JP | 2007123760 | 11/2007 |
| JP | 2008511229 | 4/2008 |
| JP | 2009514050 | 4/2009 |
| JP | 2010079831 | 4/2010 |
| KR | 2005008068 | 10/2005 |
| WO | 96/41495 | 12/1996 |
| WO | 98/31155 | 7/1998 |
| WO | 00/55783 | 9/2000 |
| WO | 01/11506 | 2/2001 |
| WO | 01/44975 | 6/2001 |
| WO | 01/52462 | 7/2001 |
| WO | 02/50694 | 6/2002 |
| WO | 03/067376 | 8/2003 |

OTHER PUBLICATIONS

United States Patent and Trademark Office, "Final Office Action", issued in connection with U.S. Appl. No. 13/840,543, Jan. 20, 2016, 57 pages.

Patent Cooperation Treaty, "International Preliminary Report on Patentability," issued in connection with Application No. PCT/US2014/028176, Sep. 15, 2015, 7 pages.

United States Patent and Trademark Office, "Notice of Allowance", issued in connection with U.S. Appl. No. 13/840,594, May 26, 2015, (12 pages).

United States Patent and Trademark Office, "Office Action", issued in connection with U.S. Appl. No. 13/840,594, Mar. 11, 2015, (28 pages).

State Intellectual Property Office of China, "Notice of Allowance," issued in connection with Application No. 201210296506.2, Mar. 18, 2015, 5 pages.

Canadian Intellectual Property Office, "Notice of Allowance", issued in connection with Canadian Patent Application No. 2,781,018, Apr. 16, 2015, 1 page.

Canadian Intellectual Property Office, "Notice of Allowance", issued in connection with Canadian Patent Application No. 2,748,997, Mar. 16, 2015, 1 page.

IP Australia, "Patent Examination Report No. 1" issued in connection with Application No. 2014210640, May 27, 2015, 4 pages.

United States Patent and Trademark Office, "Office Action", issued in connection with U.S. Appl. No. 13/840,543, May 21, 2015, (27 pages).

The State Intellectual Property Office of China, "First Office Action", issued in connection with Chinese Patent Application No. 201210296506.2, dated Sep. 2, 2014 (21 pages).

Japanese Patent Office, "Notice of Reasons for Rejection", issued in connection with Japanese Patent Application No. P2011-177687, dated Jun. 4, 2013 (7 pages).

IP Australia, "Notice of Acceptance", issued in connection with Australian Patent Application No. 2011211444, Apr. 29, 2014 (2 pages).

Canadian Intellectual Property Office, "Notice of Allowance", issued in connection with Canadian Patent Application No. 2,749,013, dated Nov. 4, 2014 (1 page).

Chinese Patent Office, "Office Action" issued in corresponding application No. 201110294045.0, dated Sep. 26, 2013 (26 pages, English translation included).

Chinese Patent Office, "Office Action" issued in corresponding application No. 201110305485.1, dated Sep. 22, 2013 (22 pages, English translation included).

United States Patent and Trademark Office, "Final Office Action", issued in connection with U.S. Appl. No. 12/856,651 on Aug. 28, 2013 (16 pages).

Dossick, S.E. et al., "WWW access to legacy client/server applications," Fifth International World Wide Web Conference, May 6-10, 1996, Paris, FR, http://iw3c2.cs.ust.hk/WWW5/www5conf.inria.fr/fich_html/papers/P4/Overview.html, (12 pages).

Zenel, B., et al., "A general Purpose Proxy Filtering Mechanism Applied to the Mobile Environment," Wireless Networks, ACM, US, vol. 5, No. 5, Oct. 1999 (Oct. 1999), XP000902494, (9 pages).

Diffie W. et al., "Privacy and Authentication: An introduction to Cryptography" Proceedings of the IEEE, IEEE. New York, US, vol. 67, No. 3, Mar. 1979 (Mar. 1979), pp. 397-426, SP000575227, (32 pages).

Srivastava, J., et al. "Web Usage Mining: Discovery and Applications of Usage Patterns from Web Data" ACM SIGKDD Explorations Newsletter, vol. 1, Issue 2, pp. 12-23, Jan. 2000, (12 pages).

Boyan, J. "The Anonymizer—Protecting User Privacy on the Web," Computer-Mediated Communication Magazine, 'Online! 1997, XP002231197, http://www.december.com/cmc/mag/1997/sep/toc.html, retrieved in 1997, (6 pages).

Choo, C. et al. "A Behavioral Model of Information Seeking on the Web—Preliminary Results of a Study of How Managers and IT Specialists Use the Web," Oct. 25, 1998, (16 pages).

European Patent Office, "European Search Report", Issued in connection with Application No. 11006705.5-2413, Oct. 14, 2011, (7 pages).

European Patent Office, "Partial European Search Report", Issued in connection with Application No. 11006706.3-2413, Oct. 25, 2011, (7 pages).

Wavecrest Computing, "Cyfin Proxy User Manual for Version 8.2.x", XP55009573, URL:http://downloads.wavecrest.net/release/cyfin/manuals/v820/cyfinProxyManual.pdf, Apr. 9, 2010, (147 pages).

"User Identification and Authentication Vital Security 9.2", XP55009307, http://www.m86security.com/software/secure_

(56) References Cited

OTHER PUBLICATIONS web_gateway/manuals.9.2.0/User_Identification_and_Authentication.pdf, Apr. 25, 2010, (27 pages).
"HTTP Proxy Authentication and iPhone Apps", XP55009373, https://discussions.apple.com/message/8018666#8018666, Jan. 15, 2009, (4 pages).
United States Patent and Trademark Office, "Office Action", issued in connection with U.S. Appl. No. 12/856,651, Mar. 27, 2012, (12 pages).
European Patent Office, "Extended European Search Report and European Search Opinion", issued in connection with European Patent Application No. 11006706.3-2413, Apr. 5, 2012, (15 pages).
Japanese Patent Office, "Notice of Reasons for Rejection", issued in Patent application No. P2011-177687, Dated Aug. 21, 2012 (3 pages, English translation included).
United States Patent and Trademark Office, "Office Action", issued in connection with U.S. Appl. No. 12/856,643, Jun. 18, 2012, (9 pages).
Japanese Patent Office, "Notice of Reasons for Rejection", issued in Patent application No. P2011-177690, Dated Aug. 21, 2012 (4 pages, English translation included).
European Patent Office, "Partial European Search Report and European Search Opinion", issued in connection with European Patent Application No. 12004911.9-2413, Dec. 13, 2012, (8 pages).
European Patent Office, "Extended European Search Report", issued in connection with EP patent application No. 12004911.9-1856/2549713, mailed Apr. 3, 2013 (11 pages).
IP Australia, "Patent Examination Report No. 1", issued in connection with AU patent application 2011211443, issued Apr. 2, 2013, (3 pages).
IP Australia, "Patent Examination Report No. 1", issued in connection with AU patent application 2011211444, issued Apr. 2, 2013, (3 pages).
Japan Patent Office, "Notice of Reasons for Rejection", issued in connection with JP patent application No. P2012-145685, mailed May 7, 2013 (4 pages, English translation included).
IP Australia, "Patent Examination Report No. 1", issued in connection with AU patent application No. 2012203829, mailed May 21, 2013 (3 pages).
Japanese Patent Office, "Notice of Reasons for Rejection", issued in Patent application No. P2011-177690, Dated Jun. 25, 2013 (4 pages, English translation included).
United States Patent and Trademark Office, "Final Office Action", issued in connection with U.S. Appl. No. 12/856,643, May 9, 2013, (10 pages).
Chinese Patent Office, "Notice of Allowance" in application No. 201110294045.0, dated Jul. 4, 2014 (5 pages, English translation included).
IP Australia, "Notice of Acceptance", issued in connection with AU patent application 2012203829, issued Jun. 12, 2014, (2 pages).
United States Patent and Trademark Office, "Notice of Allowance", issued in connection with U.S. Appl. No. 12/856,643, Aug. 5, 2014, (5 pages).
Canadian Patent Office, "Office Action" issued in connection with Canadian Patent Application No. 2,748,997, dated Nov. 21, 2013 (2 pages).
Canadian Patent Office, "Office Action" issued in connection with Canadian Patent Application No. 2,749,013, dated Sep. 10, 2013 (2 pages).
Canadian Patent Office, "Office Action" issued in connection with Canadian Patent Application No. 2,781,018, dated Apr. 7, 2014 (3 pages).
Chinese Patent Office, "Office Action" issued in connection with application No. 201110294045.0, dated Apr. 3, 2014 (5 pages, English translation included).
United States Patent and Trademark Office, "Non-Final Office Action", issued in connection with U.S. Appl. No. 13/840,594, dated Sep. 19, 2014 (12 pages).
United States Patent and Trademark Office, "Notice of Allowance", issued in connection with U.S. Appl. No. 12/856,643, Apr. 10, 2014, (14 pages).
United States Patent and Trademark Office, "Notice of Allowance", issued in connection with U.S. Appl. No. 13/174,517, Aug. 22, 2013, (19 pages).
United States Patent and Trademark Office, "Notice of Allowance", issued in connection with U.S. Appl. No. 13/174,517, Oct. 25, 2013, (6 pages).
United States Patent and Trademark Office, "Notice of Allowance", issued in connection with U.S. Appl. No. 13/174,517, Sep. 26, 2013, (6 pages).
United States Patent and Trademark Office, "Office Action", issued in connection with U.S. Appl. No. 13/174,517, Aug. 15, 2012, (13 pages).
United States Patent and Trademark Office, "Advisory Action", issued in connection with U.S. Appl. No. 12/856,651 dated Nov. 22, 2013 (3 pages).
United States Patent and Trademark Office,"Notice of Allowance", issued in connection with U.S. Appl. No. 12/856,651 dated Jul. 7, 2014 (11 pages).
International Searching Authority, "International Search Report and Written Opinion", issued in connection with International Application No. PCT/US2014/028176, dated Sep. 1, 2014 (11 pages).
United States Patent and Trademark Office, "Final Office Action", issued in connection with U.S. Appl. No. 14/537,488, Oct. 21, 2016, (27 pages).
United States Patent and Trademark Office, "Non-Final Office Action", issued in connection with U.S. Appl. No. 13/840,543, Jan. 26, 2017, (31 pages).
United States Patent and Trademark Office, "Final Office Action", issued in connection with U.S. Appl. No. 14/529,784, Jan. 26, 2017, (21 pages).
European Patent Office, "Communication Pursuant to Article 94(3) EPC", issued in connection with Application No. 11006706.3, Mar. 21, 2016, (9 pages).
Canadian Patent Office, "Office Action" issued in connection with Canadian Patent Application No. 2,748,997, Dated Nov. 24, 2015 (5 pages).
European Patent Office, "Communication under Rule 71(3) EPC", issued in connection with European Patent Application No. 12004911.9, Feb. 2, 2016, (74 pages).
IP Australia, "Notice of Grant", issued in connection with AU patent application 2011211444, mailed Aug. 21, 2014, (2 pages).
IP Australia, "Notice of Grant", issued in connection with Australian Application No. 2012203829, dated Oct. 9, 2014 (2 pages).
United States Patent and Trademark Office, "Non-Final Office Action", issued in connection with U.S. Appl. No. 14/041,613, Aug. 6, 2015, (10 pages).
United States Patent and Trademark Office, "Notice of Allowance", issued in connection with U.S. Appl. No. 14/041,613, Nov. 25, 2015, (9 pages).
United States Patent and Trademark Office, "Pre-Brief Appeal Conference Decision", issued in connection with U.S. Appl. No. 12/856,651, Jan. 13, 2014, (2 pages).
United States Patent and Trademark Office, "Non-Final Office Action", issued in connection with U.S. Appl. No. 14/529,784, Aug. 5, 2016, (10 pages).
Intellectual Property Office of China, "1st Office Action," issued in connection with application No. 201410432742.1 dated Mar. 29, 2017, 16 pages.
U.S. Patent and Trademark Office, "Notice of Allowance", issued in connection with U.S. Appl. No. 14/529,784, dated Apr. 26, 2017 (9 pages).

400 →

```
GET www.google.com HTTP/1.1
Host: proxy.MonitoringEntity.com:80
User-Agent: Safari_iPhone.6789          ← 405
Accept: text/html,application/xhtml+xml,application/xml;q=0.9,*/*;q=0.8
Accept-Language: en-us,en;q=0.5
Accept-Encoding: gzip,deflate
Accept-Charset: ISO-8859-1,utf-8;q=0.7,*;q=0.7
Keep-Alive: 115
Connection: keep-alive
```

FIG. 4

SYSTEMS, METHODS, AND APPARATUS TO MONITOR MOBILE INTERNET ACTIVITY

RELATED APPLICATION

This patent arises from a continuation of U.S. patent application Ser. No. 12/856,643, which was filed on Aug. 14, 2010. U.S. patent application Ser. No. 12/856,643 is hereby incorporated herein by reference in its entirety.

FIELD OF THE DISCLOSURE

This disclosure relates generally to monitoring Internet activity, and, more particularly, to systems, methods, and apparatus to monitor mobile Internet activity.

BACKGROUND

In recent years, methods of accessing Internet content have evolved. For example, Internet content was formerly primarily accessed via computer systems such as desktop and laptop computers. Recently, handheld mobile devices (e.g., smartphones) have been introduced that allow users to request and view Internet content. Typically, mobile devices request and receive Internet content via a wireless access network such as, but not limited to, an 802.11g WiFi network.

BRIEF DESCRIPTION OF THE DRAWINGS

FIG. 4 is an example Hypertext Transfer Protocol (HTTP) request as received by the example proxy of FIGS. 1, 2, and 3.

DETAILED DESCRIPTION

Figure 1:
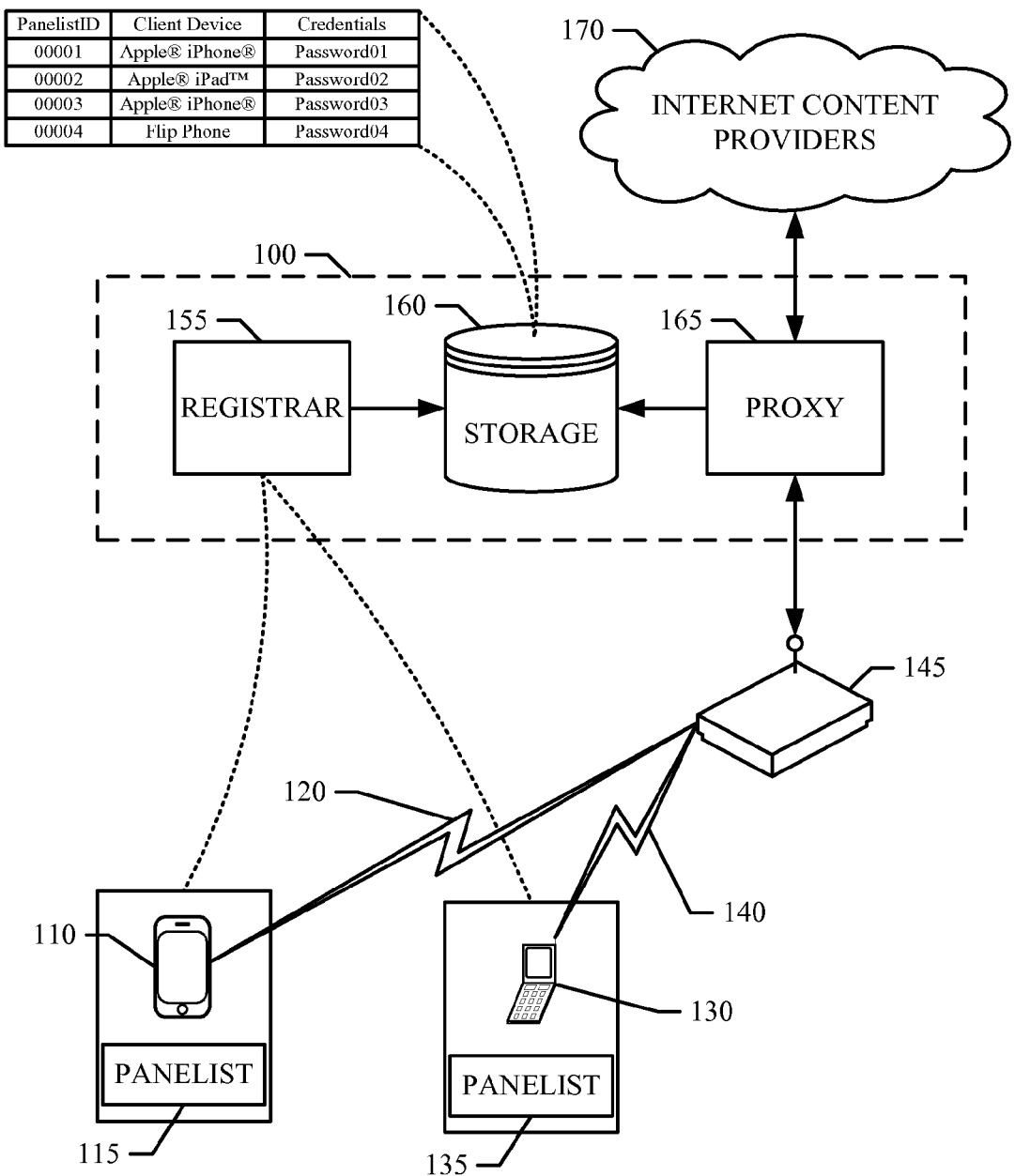
FIG. 1 is a block diagram of an example system to monitor mobile Internet activity.

Mobile monitoring companies desire to gain knowledge on how users interact with their handheld mobile devices such as smartphones. In particular, the mobile monitoring companies want to monitor Internet traffic to and/or from the handheld mobile devices to, among other things, monitor exposure to advertisements, determine advertisement effectiveness, determine user behavior, identify purchasing behavior associated with various demographics, etc. Some known systems have utilized a proxy server to monitor Internet content being transmitted to and from the monitored device.

Such known monitoring systems implemented the proxy server as a Hypertext Transfer Protocol (HTTP) proxy that communicated with monitored handheld devices via a single port and required the monitored devices to provide authentication credentials including a username/device name and password that uniquely identified the mobile device involved in this Internet communication. These monitoring systems allowed mobile monitoring companies to associate Internet activity with the mobile device it originated from based on the username and password. Internet activity on handheld mobile devices is not limited to use of browsers (e.g., Apple® Safari®). For example, the Apple® iPhone® and Apple® iPad™ support many third party applications (sometimes referred to as "Apps") accessing Internet content to perform a special function. For example, a weather application may request and display HTTP data from www.weather.com. These apps typically do not permit unrestricted browsing from website to website on the Internet (although they may permit movement within a defined set of webpages). Thus, apps typically provide access to a limited set of data on the Internet. In contrast, a browser enables a user to access virtually any publicly available site on the Internet (subject to restrictions such as content blockers) and directly shows the user the contents of a website such as www.weather.com.

While some applications accessing Internet content properly respond to proxy requests to provide credentials, many applications, such as the weather application from the previous example, do not presently support proxy authentication and therefore fail to function if a proxy requests credentials. This can be frustrating for panelists and may cause the panelist to abandon participation in the monitoring panel. Furthermore, it is desirable for monitoring entities to monitor Internet activity without affecting the manner in which users behave. Causing application failure due to a monitoring technique is inconsistent with that desire.

Some example methods of monitoring involve using an un-authenticated proxy on a port uniquely assigned to the panelist and/or handheld mobile device. However, when the handheld mobile device communicates via a WiFi network, a firewall likely exists between the handheld mobile device and the proxy. For example, many businesses and/or companies use firewalls to prohibit malicious and/or unwanted Internet content from reaching the users of their network. Firewalls block and/or prohibit malicious and/or unwanted Internet content by blocking particular ports. Ports 0 through 1023 are defined as Well Known Ports by the Internet Assigned Numbers Authority (IRNA), and are prohibited from use without registration with IRNA, and therefore, communications over the Well Known Ports are more likely to be legitimate communications, and are conversely less likely to be blocked. Internet communications outside of the Well Known Ports range may be determined to be malicious and/or unwanted, and, thus, may be blocked by a firewall. The firewall may block all Internet communications from port 1024 to port 65535, and if the uniquely assigned port is within the blocked range (e.g., port 1024 to port 65535); the Internet communications of the handheld mobile device may be blocked. Because firewalls may be configured to block communication on unregistered ports, some panelists (e.g., panelists communicating via a blocked port) may experience application failures when using a WiFi network. This can be frustrating for panelists and may cause the panelist to abandon participation in the monitoring panel. Again, it is desirable for monitoring entities to monitor Internet activity without affecting the manner in which users behave. Causing application failure due to a monitoring technique is inconsistent with that desire.

To avoid errors inherent in using both an un-authenticated proxy (e.g., proxy ports being blocked by a firewall) and an authenticated proxy (e.g., applications failing to properly respond to requests for authentication credentials), the example system shown in FIG. 1 employs an actively filtered proxy. The actively filtered proxy monitors the Internet communications, and requests authentication credentials for applications supporting proxy authentication, while allowing un-authenticated Internet communications when the Internet communications originate from an application that does not support authentication credentials.

When an application of the client device requests Internet content, the application embeds a user agent field in the request for content. The user agent Field represents the application that is requesting the content. For example, if a browser application was to request Internet content, the user agent field identifies to the content server that a browser application was requesting the content. If an application is known to respond to requests for authentication, the monitoring system of FIG. 1, upon receiving a request from the application, determines if valid credentials were supplied. If valid credentials are supplied, the monitoring system forwards the request to the Internet content provider identified by the request. Alternatively, if an application is known to not respond to requests for authentication, the monitoring system, upon receiving a request from the application, forwards the request to the Internet content provider identified by the request.

Applications are being developed every day and, therefore, new user agent identifiers are constantly being generated. For example, upon the release of a new version of an application, a new user agent identifier may identify the version of the application requesting Internet content. To properly identify applications that respond to requests for authentication, the user agent is matched against applications where the authentication capabilities are known. For example, if a new version of a browser application is released and includes a new user agent identifier, the user agent identifier of previous versions of the browser application may substantially match the user agent identifier of the new version. If the previous version of the browser application supported authentication, it is likely that the next version will also support authentication, and therefore authentication credentials are required.

The monitoring system may then record the data that the client devices request and/or receive and/or some or all of the data itself. Identifications of data and/or the data itself (e.g., web content) are collectively referred to herein as "session data." The session data is recorded in association with the panelist via the credentials with which the session data is transmitted. From the recorded session data and recorded credentials, the monitoring system can uniquely identify the site(s) that a particular panelist is visiting and how the panelist interacted with their mobile device, while avoiding interruption of services for the panelist.

FIG. 1 is a block diagram of an example system 100 to monitor mobile Internet activity. The example system monitors Internet traffic to and/or from handheld mobile devices (e.g., a first client device 110 associated with a first panelist 115, a second client device 130 associated with a second panelist 135). The monitored Internet traffic between the monitored devices (e.g., the client device 110, and the client device 130) and Internet sites (illustrating Internet content provider(s) 170) is routed to the example monitoring system 100. As shown in FIG. 1, the traffic passes through a wireless (e.g., WiFi) communication system (e.g., an Internet service provider 145 and communicative links 120, 140). The example monitoring system 100 includes a registrar 155, a storage database 160, and a proxy 165.

The example first and second client devices 110, 130 of FIG. 1 are handheld mobile devices. While in the illustrated example the first client device 110 is shown as an Apple® iPhone® and the second client device 130 is shown as a flip phone, any other type of device may be used. For example, other types or phones, a laptop computer, a desktop computer, a personal digital assistant (PDA), a netbook, or a tablet computer (e.g., an Apple® iPad™) may additionally or alternatively be used. The first and second client devices 110, 130 may implement any mobile operating system, and may implement any type of hardware and/or form factor. In the illustrated example, the first and second client devices 110, 130 are mobile devices and communicate via the first and second wireless communication links 120, 140.

The first and second communication links 120, 140 of the illustrated example are WiFi communication links. However, any other method and/or system of communication may additionally or alternatively be used such as, for example, an Ethernet connection, a Bluetooth connection, a cellular connection, etc. Further, the example first and second communication links 120, 140 of FIG. 1 implement the WiFi connection via an Institute of Electrical and Electronics Engineers (IEEE) 802.11g standard. However, any other systems and/or protocols for communications may be used such as, for example, IEEE 802.11n, IEEE 802.11b, etc.

The first and second panelists 115, 135 of the illustrated example are panelists participating in a monitoring service. Although the example system of FIG. 1 is a panelist-based system, non-panelist and/or hybrid panelist systems may alternatively be employed. In the panelist system of the illustrated example, demographic information is obtained from the user when the user joins and/or registers for the panel. The demographic information may be obtained from the user via a telephone interview, by having the user complete an online survey, etc. Additionally or alternatively, panelists may be contacted and/or enlisted using any desired methodology (e.g., random selection, statistical selection, phone solicitations, Internet advertisements, surveys, advertisements in shopping malls, etc.).

In the illustrated example, the first and second panelists 115, 135 are associated with the first and second client devices 110, 130, respectively. In the illustrated example, the client devices 110, 130 are owned, leased, or otherwise belong to their respective panelists. The monitoring entity of the illustrated example does not provide the client devices. In other systems, panelists may be provided with client devices to participate in the panel. While in the illustrated example, the first and second client devices 110, 130 are each associated with a single panelist, the first and second client devices 110, 130 may alternatively be associated with more than one panelist. For example, a family may have a single client device that may be shared amongst multiple users. The sharing of a client device is less common when the client device is a cellular phone then when the client device is a portable computer (e.g., an Apple® iPad™).

The Internet service provider 145 of the illustrated example provides wireless Internet service to the first and second client devices 110, 130 via the communication links 120, 140. In the illustrated example, the wireless service is provided via a WiFi connection. However, the Internet service provider 145 may provide Internet service via any other type of connection. Further, the Internet service provider 145 may implement the WiFi connection via the IEEE 802.11g standard. However, any other systems and/or protocols for communications may be used. In practice, the Internet service provider 145 is sometimes referred to as a local access point, and provides a local area network to the client devices. In the illustrated example, the Internet service provider includes a firewall that blocks all ports that are not within the Well Known Ports range as defined by IRNA (ports 1024 to 65535). However, the ports blocked by the firewall may be any other ports, and may vary from Internet service provider to Internet service provider. For example, a security policy of a firewall of a corporate network (e.g., at an office or business) may be more restrictive and block more ports than a security policy of a firewall of a public network (e.g., a wireless access network hosted in a public location, such a coffee shop).

In the illustrated example, the monitoring system 100 is shown as multiple computing systems. However, the monitoring system 100 may ultimately be comprised of a single computing system. In the illustrated example, the monitoring system 100 includes the registrar 155, the storage database 160, and the proxy 165. However, additional structures may be implemented to carry out one or more portions of the functionalities implemented by the registrar 155, the storage database 160, and/or the proxy 165, and/or other functions.

In the example of FIG. 1, the registrar 155 receives registration information from the panelists 115, 135 and stores a record identifying the panelist 115, 135 and/or their respective client devices 110, 130. In the illustrated example, the received registration information includes demographic information. However, any other information may additionally or alternatively be collected. The registration information may include, for example, information identifying the model of mobile device associated with the panelist, a mailing address associated with the panelist, an email address associated with the panelist, a phone number associated with the mobile device, a unique identifier of the panelist and/or mobile device (e.g., a social security number of the panelist, a phone number of the mobile device, a zip code of the panelist, and/or any combination or derivation of any information related to the panelist and/or mobile device), the age of the panelist, the gender of the panelist, the race of the panelist, the income of the panelist, where the panelist typically intend to use their device, how long the panelist has owned their device, the education level of the panelist and/or any other information related to the panelist and/or the mobile device.

In the illustrated example, the registration data is received by the registrar 155 via an electronic interface (e.g., by a panelist entering data into a form at a website or answering survey questions at a website). However, the registrar may receive the registration data may via other means. For example, the registrar may receive the registration data via a personal interview (by telephone or in person), a telephone interface, direct mailing, purchased lists, etc. While the registrar 155 of the illustrated example is an electronic system, the registrar 155 may alternatively be implemented manually by a person or group of people collecting and entering the registration data into the storage database 160.

Upon receiving the registration data, the registrar 155 of the illustrated example creates a record associating the panelist and a device identifier information with the collected demographic information. The registrar 155 may also assign a unique alphanumeric identifier to the panelist or device. The identifier may be based on, for example, a serial number of the client device. The record is stored in the storage database 160. In the illustrated example, the registrar 155 also assigns unique credentials to the panelist 115, 135 and/or the client device 110, 130 and stores the credentials in the record (or in association with the record for that panelist and/or client device). As noted above, in addition to assigning and storing the credentials, the registrar may assign and store additional identifiers. For example, the registrar may assign and store an identifier of the client device and/or the panelist. The panelist or client device identifier(s) may be the same as the credentials, or they may be different from the credentials. Further, when storing the credentials in the storage database 160, the registrar may encode and/or encrypt the credentials to provide security and/or anonymity to the panelists.

In addition to assigning and storing the credentials, the registrar 155 of the illustrated example generates a configuration document. In the illustrated example, the configuration document instructs the panelist to configure the client device. The instruction document in the illustrated example is an email message. However, any other type of instruction document may additionally or alternatively be used. For example, a portable document format (PDF) document and/or a Microsoft® Word® document may be sent to the panelist as an attachment to an email message. Further, the configuration file may be custom generated for the particular type of mobile device based on the model of the mobile device as received by the registrar as part of the registration data.

Alternatively, the configuration document may comprise an electronically readable file that may instruct the mobile device to apply the settings contained in the configuration document. In some examples, the configuration document is an Extensible Markup Language (XML) file implementing a property list (referred to herein as a plist) file comprising configuration data such as the credentials, a port number, and an Internet proxy address to be used by the corresponding panelist and/or client device. However, any other type of document may be generated such as, for example, a comma separated (CSV) document, a portable document format (PDF) document, a Microsoft® Word® document, etc. In the illustrated example, the configuration document is signed using a public/private key infrastructure. However, the configuration may alternatively not be signed. If the configuration document is not signed, it may appear as an invalid configuration file to the panelist, which may cause the panelist to abandon participation in the panel. The configuration document is sent to the corresponding client device (e.g., via an email message with the file attached or with a link to the file). The client device may then interpret the data in the configuration file, thereby applying the data (e.g., the credentials and Internet proxy address) to future communication of the mobile device. In the illustrated example, the configuration file causes the mobile device to send all Internet traffic to the Internet address of the proxy 165 and to specify the credentials assigned to the client device in such communication. As a result, all Internet communications to and/or from the mobile device are addressed to the proxy 165 and can, when authenticated, be identified or associated with that particular client device. In the illustrated example the plist file is implemented for interpretation by an Apple® iPhone®, an Apple® iPod®, an Apple® iPad™. However, the mobile device may be any other type of mobile device, and may accept any type of configuration document.

While in the example of FIG. 1, the configuration document is an instruction document that instructs the panelist to configure the client device to communicate with the proxy 165. However, the configuration document may additionally or alternatively be an electronic document that may be interpreted by the client device to automatically configure the client device to communicate Internet related messages the proxy 165. The configuration document may thereby instruct the panelist on how to apply the data stored in the configuration document or may instruct the panelist on how to directly apply the data stored in the configuration document to the client device.

As noted in the illustrated example above, the configuration document is transmitted to the panelist via an email message. However, any other means of transmitting the configuration document to the panelist may additionally or alternatively be used. For example, an email message may be transmitted containing a hyperlink to the configuration document, the configuration document may be transmitted to the panelist via a Short Message Service (SMS) message, the configuration document may be mailed to the panelist, and/or a telephone call may be placed to the panelist to instruct the panelist to configure the client device.

Finally, the registrar 155 transmits the configuration document to the panelist and/or client device. In the illustrated example, the configuration document is provided via an electronic mail (email) message. The email message includes a hyperlink to download the configuration document to the client device. However, any other methods of transmitting the configuration document may additionally or alternatively be used. For example, the configuration document may be transmitted as an attachment to the email message, the registrar 155 may transmit a short message service (SMS) message comprising a link to or a textual representation of an Internet address where the client device may download the configuration document, a direct mailing may be sent to the panelist comprising the configuration document and/or additionally comprising an electronic medium containing the configuration document, a telephone call may be placed to orally instruct the panelist on how to configure the client device, etc.

The registrar 155 of FIG. 1 is implemented by a processor executing instructions, but it could alternatively be implemented by an ASIC, DSP, FPGA, or other circuitry. The storage database 160 receives and stores identifiers associating the panelists 115, 135 with the client devices 110, 130 from the registrar 155. Additionally, the storage database 160 receives and stores monitoring data from the proxy 165. The monitoring data is associated with the corresponding panelist and/or client device via the authentication credentials used for the corresponding monitored Internet traffic, when credentials are provided. The storage database 160 may also be capable of storing data that is not identifiers and/or measurement data. For example, updated software and/or updated firmware for any component of the monitoring system 100 may be stored in the storage database 160. Further, the storage database 160 may be capable of storing information that enables the registrar 155 to generate the configuration document. For example, the storage database 160 may store registration information such as the model of the client device 110, 130. Additionally, the storage database 160 may store demographic data as collected by the registrar 155.

The storage database 160 may be any device for storing data such as, for example, flash memory, magnetic media, optical media, etc. Furthermore, the data stored in the storage database 160 may be in any data format such as, for example, binary data, comma delimited data, tab delimited data, structured query language (SQL) structures, etc. While in the illustrated example the storage database is illustrated as a single database, the storage database 160 may be implemented by multiple databases.

The proxy 165 of the illustrated example receives requests from the client devices 110, 130 via the wireless Internet service provider 145. The requests of the client devices 110, 130 are received by the proxy 165 due to the configuration document having been applied to respective ones of the client device instructing the client device to transmit all subsequent requests through the proxy 165. In the illustrated example, the proxy 165 receives Internet content requests via at least one Well Known Port (e.g., port 0 through port 1023). By only using Well Known Ports, it is less likely that the Internet communications will be blocked by a firewall. While in the illustrated example, a single proxy 165 is used, any number of proxies may represent the proxy 165 of FIG. 1. Since the only limiting factor to the number of panelists that can be serviced is the processing power of the proxy 165, this size of the panel can be expanded by using additional proxies at other Internet addresses. The additional proxies at other Internet addresses may be implemented by the same proxy 165 or by multiple proxies. For example, the proxy 165 may have multiple Internet addresses assigned to a network interface of the proxy 165 (e.g., virtual interfaces), or the proxy 165 may have multiple network interfaces each having an Internet address. While in the illustrated example only ports used within the Well Known Ports range are used, any other ports may additionally or alternatively be used. For example, ports within the Registered Ports range and/or the Dynamic and/or Private Ports range may potentially be used to accept requests for Internet content from the panelists. In a scenario where a panel monitoring system such as the monitoring system 100 is being tested, a typical panel will include at least sixty panelists. In a scenario where an ongoing panel is used a panel size of at least 1,500 panelists may be used.

Upon receiving a request from a client device 110, 130, the proxy 165 retrieves the requested Internet content from the Internet content providers 170 (or from a local cache if, for example, it had previously been requested and stored). In order to identify the panelist associated with the request, the proxy 165 determines whether the request originated from an application that supports proxy authentication. If the application is identified to support proxy authentication, the proxy 165 determines whether credentials were provided. If no credentials were provided, the proxy 165 requests credentials from the requesting device. If credentials were provided, the proxy associates the request with the panelist via the credentials.

Typically, the port used by the proxy to communicate with content providers 170 is limited to hypertext transfer protocol (HTTP) data that occurs over port 80. After retrieving the requested Internet content from the Internet content provider(s) 170, in the illustrated example the content is relayed to the requesting client device 110, 130 via the assigned port. Additionally or alternatively, the content may be relayed to the requesting client device 110, 130 via a port other than the assigned port (e.g., port 80).

The proxy 165 of the illustrated example stores the requests for Internet content and/or portion(s) of such requests originating from the client devices 110, 130 in the storage database 160 in association with the credentials with which the request was received. In storing the requests, the proxy 165 may additionally store other identifiers such as, for example, the identifier of the client device 110, 130, the identifier of the panelist 115, 135, and/or the credentials provided by the client device 110, 130. Additionally or alternatively, the proxy 165 may store a portion of the Internet content in the storage database 160. For example, the proxy 165 may store the body of a webpage transmitted to the client device 110, 130. In another example, the proxy 165 may store an identifier of an advertisement appearing on the webpage transmitted to the client. This is particularly useful in situations where advertisements are rotated at websites. Additionally or alternatively, the proxy 165 may store characteristics of the response, such as, for example the HTTP header, a status code of the HTTP header, a content type of the HTTP header, etc.

The Internet content providers 170 supply content to clients via the Internet. In the illustrated example, the proxy 165 acts an intermediary for the client devices 110, 130, and, thus, is the client of the Internet content providers 170. Internet content is often supplied over port 80, as most Internet content is in the form of HTTP data. However, any other port may be used to supply Internet content. For example, File Transfer Protocol (FTP) data may be transmitted over port 21, HTTP over Secure Socket Layer (SSL) may be transmitted over port 443, etc.

The Internet content providers 170 can be any provider. For example, the Internet content providers 170 may comprise a web server hosting webpages formatted as Hypertext Markup Language (HTML) content. Alternatively, the Internet content provider 170 may be an application server providing application content to applications accessing Internet content. The application content may be formatted as HTML, XML, or may use any other protocol or port to return content to the requester. In some examples, the application data is implemented in a protocol specifically targeted for an application requesting Internet content (e.g., as the weather application described above).

Figure 2:
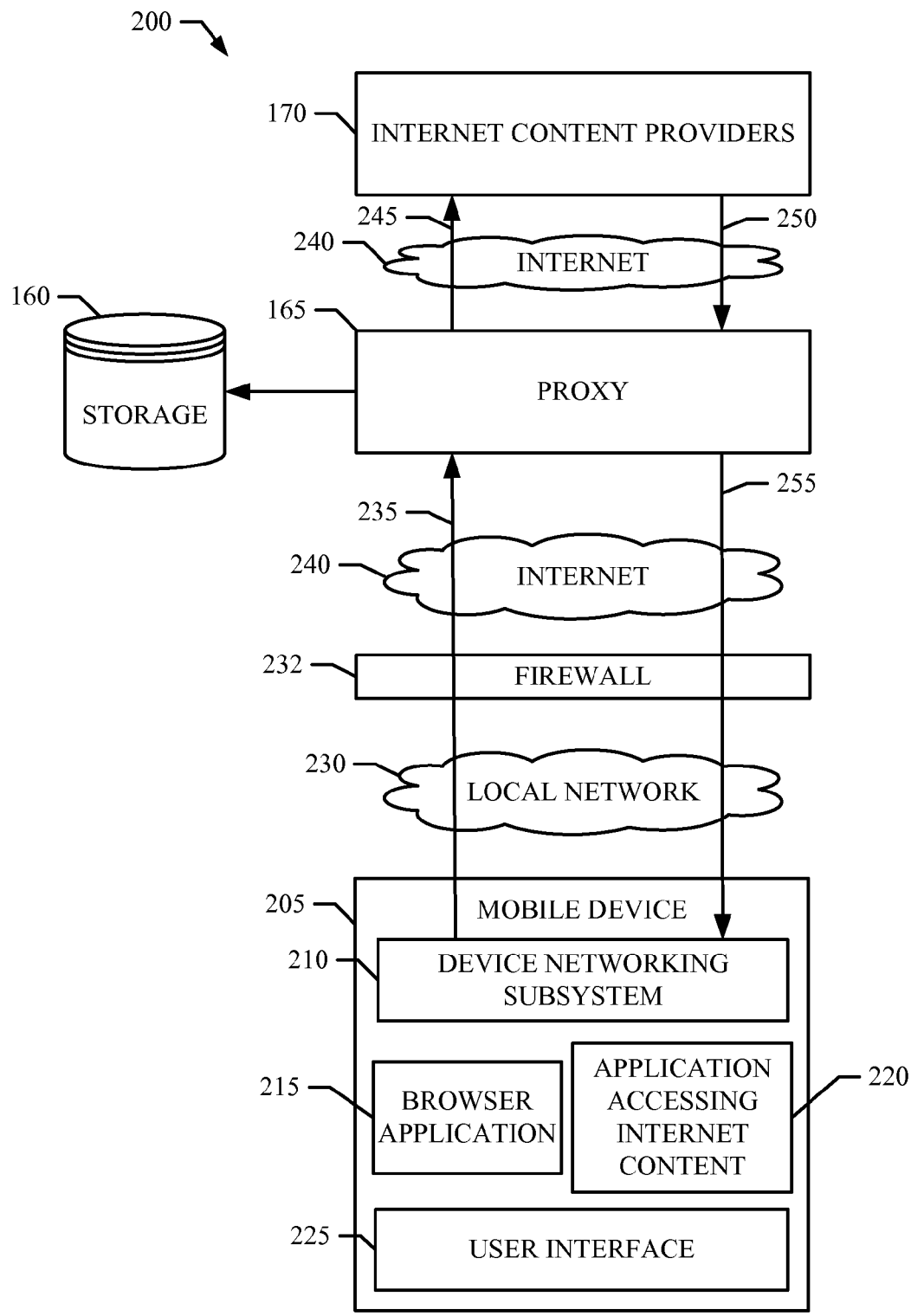
FIGS. 2 and 2A are a block diagrams illustrating an example request and response flow through the example system of FIG. 1.

FIG. 2 is a block diagram 200 illustrating an example request and response flow through the example system of FIG. 1. The block diagram 200 of FIG. 2 illustrates communication between a mobile device 205, a local network 230, a firewall 232, the proxy 165, the storage database 160, the Internet 240, and the Internet content providers 170. The mobile device 205 represents either of the client devices 110, 130 and comprises a device networking subsystem 210, a browser application 215, an application accessing Internet content 220, and a user interface 225. Additionally, the block diagram illustrates a first request 235, a second request 245, a first response 250, and a second response 255.

The device networking subsystem 210 provides a framework for transmitting and receiving content. The device networking subsystem 210 may be implemented via an application processor, a software system that facilitates networked communication, a browser engine, a baseband processor that transmits network traffic, and/or any other system that provides a framework for transmitting and receiving content. In the illustrated example, the device networking subsystem is implemented by the networking libraries provided in the Apple® iPhone® operating system. However, any other libraries, systems, or programs may additionally or alternatively be used.

The browser application 215 and application accessing Internet content 220 are applications that are executed by a processor of the mobile device 205. The browser application 215 requests HTTP Internet content from Internet content providers 170, and renders the HTTP content for display. Additionally or alternatively, the browser application may request and render HTTPS Internet content. In some examples, the browser application is implemented by Apple® Safari®. However, any other application may alternatively be used. For example, Pocket Internet Explorer may be used. In some examples, the HTTP Internet content is HTML content. However, the content may be presented in any format that may be rendered by the browser application 215.

The application accessing Internet content 220 may be any application on the mobile device that requests Internet content. For example, the application accessing Internet content 220 may be a weather application accessing Internet content provided by www.weather.com. The Internet content provider 170 providing content for www.weather.com may respond to content requests with HTML data. However, any other type of data may be contained in the content request. For example, the Internet content provider 170 providing content for www.weather.com may provide an XML file containing a condensed weather forecast. Additionally or alternatively, the application accessing Internet content 220 may request media such as, for example, photos, video, audio, etc. Typically, applications accessing Internet content 220 are limited to a small amount of information to be displayed. For example, the weather application may not be able to display sports news. Although the browser 215 or the application accessing Internet content 220 may initiate requests for content, in some devices, such as the Apple® iPhone®, requests are formatted and transmitted by the device networking subsystem 210 based on system wide settings that control routing and/or addressing of such requests (e.g., to a specific port of a proxy 165).

The user interface 225 of the illustrated example provides a display to the user and receives input from the user. The user interface 225 may comprise hardware, a graphics library, and/or a graphics driver for displaying content to the panelist, and may comprise hardware, an input library, and/or an input driver for receiving input from the panelist. Either or both the browser application 215 and the application accessing Internet content 220 may utilize the user interface to display content and receive input.

The local network 230 is hosted by the Internet service provider 145. In the illustrated example, the local network 230 is an Internet Protocol (IP) version 4 (IPv4) based network. However, any other networking technology may additionally or alternatively be implemented. For example, the local network 230 may implement the IP version 6 (IPv6) protocol. Further, the local network 230 of the illustrated example is implemented using communication links 120, 140. While WiFi connections are shown, any other method of communication may additionally or alternatively be used such as, for example, an Ethernet network, a cellular network, etc. Additionally, the local network 230 is shown as a public network. However, the network may be a private network.

The firewall 232 of the illustrated example applies security policies to the requests and responses passing through the firewall 232. In some examples, the firewall 232 may only allow communications over the Well Known Ports (e.g., ports 0 to 1023), as the ports may represent protocols which are known to not have security risks. If communication on a port is not allowed to pass through the firewall 232, the communication is not transmitted from the requesting client device to the proxy 165.

The proxy 165 receives a request 235 for Internet content from the mobile device, retrieves the content by sending a second request 245 to the corresponding content provider 170, receive the content in a response 250 from the content provider 170, and relays the content to the mobile device 205 via a second response 255. In the illustrated example, the proxy 165 stores characteristics and/or identifiers of the request and/or response in the storage database 160. These characteristics and/or identifiers may be, for example, a timestamp of the request and/or response, an IP address of the client, a user agent of the request, a status code of the response, a content type of the response, etc. However, the proxy 165 may additionally store the Internet content of the response in the storage database 160. In relaying the request, the proxy 165 translates the port of the requests, as is described below in conjunction with FIG. 2A.

The Internet 240 in the illustrated example is a public network. However, a private network may instead be employed. For example, a network internal to an organization and/or company may be used to determine how members of the organization and/or employees of the company utilize internal web content via mobile devices.

Figure 2A:
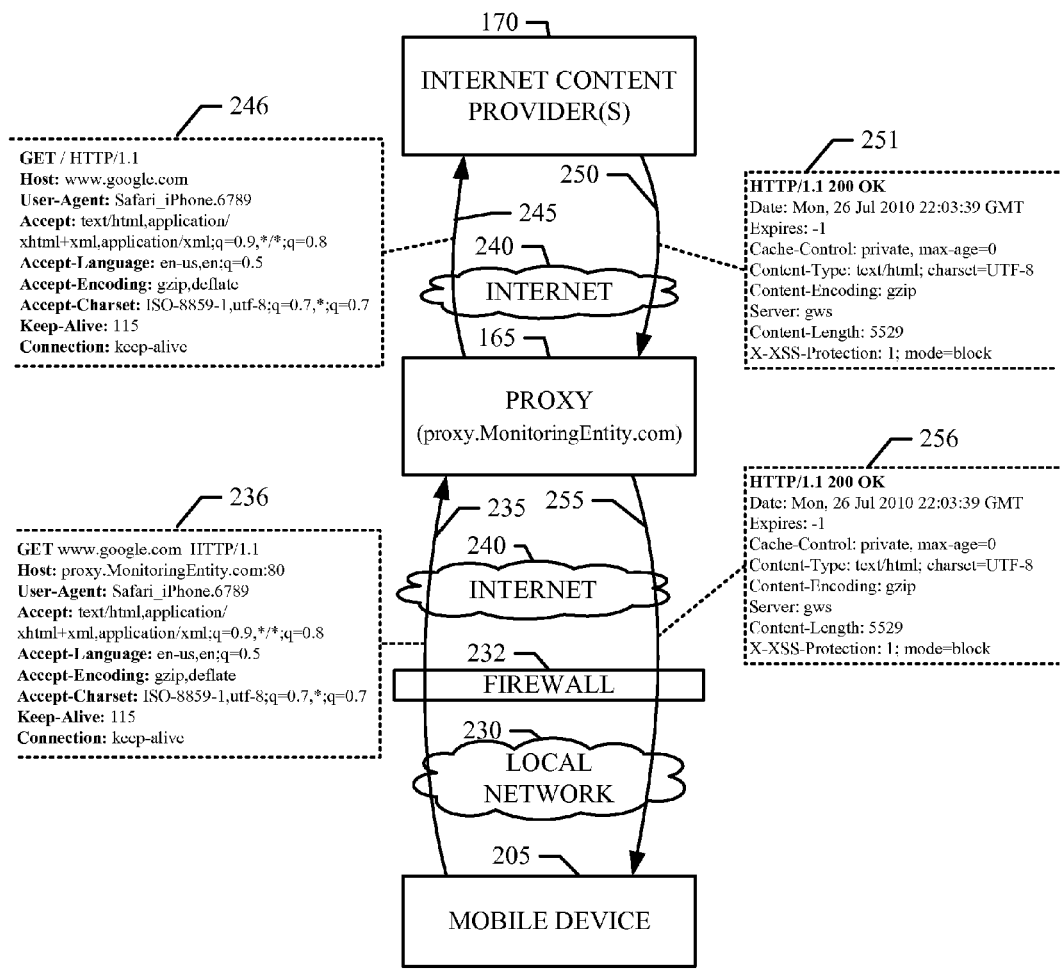

The illustrated example shows a communication stream for a single request. The first request 235 is transmitted to the proxy 165 from the mobile device 205 over the local network 230 and through the firewall. The first request 235 uses a port that is not prohibited by the firewall 232, and is for HTTP content (e.g., the request is for content that is served over port 80). However, the content requested may be requested over any port. For example, the request may be for file transfer protocol (FTP) content and may occur over port 21. The proxy 165, upon receiving the first request 235, stores some or all of the request in the storage database 160, and generates a second request 245. The second request 245 is effectively a translation of the first address as shown in FIG. 2A. The second request 245 is addressed to the Internet content provider 170 identified in the first request 235. The second request 245 in the illustrated example is transmitted via the Internet 240 over port 80, as the first request 235 identified content to be served over port 80. The Internet content provider 170 responds to the second request 245 with the first response 250. The proxy 165 receives the first response 250 via port 80, stores some or all of the request in the storage database 160, and forwards the content of the first response 250 as the second response 255 to the mobile device 205 over the port assigned to the mobile device 205.

FIG. 2A is a block diagram 201 illustrating an example request and response flow through the example system of FIG. 1. The block diagram 201 includes the proxy 165, the Internet content provider(s) 170, the mobile device 205, the carrier network 230, and the Internet 240. The block diagram 201 additionally includes the first request 235, the second request 245, the first response 250, and the second response 255. Further, the requests and responses of the illustrated example are represented by HTTP request and response headers. The first request 235 is represented by the first HTTP request header 236 and the second request 245 is represented by the second HTTP request header 246. The first response 250 is represented by the first HTTP response header 251 and the second response 255 is represented by the second HTTP response header 256.

The first HTTP request header 236 is the header of a GET request generated by the mobile device 205. In the illustrated example, the Internet content provider 170 is identified by the absolute Universal Resource Locator (URL) identified in the first line of the first HTTP request header 236 and the address of the proxy 165 and uniquely assigned port are identified by the "Host" line of the first HTTP request header 236. The host identified in the illustrated example is proxy.MonitoringEntity.com, and the port that the request was made on is 80. However, any other address identifying the proxy 165, and any other port may alternatively be used. For example, the address identifying the proxy 165 may be the Internet Protocol (IP) address of the proxy 165. In the illustrated example, the absolute URL of the Internet resource is "http://www.google.com". However, any other URL may additionally or alternatively be used.

The proxy 165 receives the first content request 235 and generates the second content request 245. The second content request 245 is represented by the second HTTP request header 246. In the illustrated example, the second HTTP request header 246 is a GET request directed to "http://www.google.com", and is transmitted over port 80 as no port other than port 80 is identified. The content being requested from "http://www.google.com/" in the illustrated example is "/". The proxy generates the contents of the second request by inspecting the first request 235. For example, the proxy 165 identifies the requested content of the first request 235 as "http://www.google.com/", determines that the port to be translated to is port 80 (identified by http://), determines that the Internet content provider 170 identified is "www.google.com", and determines that the requested webpage from the Internet content provider is "/". The second content request 245 is transmitted over port 80 because the proxy 165 determines that the requested content is HTTP content, and no alternative port number is specified. Alternatively, the content identified by the first content request 235 may be content that is provided on a port other than port 80. In that example, the absolute URL of the first HTTP request header 236 would identify the requested content as "http://www.google.com:1234/", to convey that the content identified by the request is provided on port 1234. Further, the proxy 165 would generate the second HTTP request header 246 and include port 1234 in the identified host (e.g., www.google.com:1234).

The Internet content providers 170 receive the second content request 245, and respond to the request via the first response 250. The first response 250 is transmitted to the proxy 165. In the illustrated example, the first response is transmitted over port 80, as it is a response to a content request made on port 80. However, any other port may be used to transmit the first response to the proxy 165. The proxy 165 receives the first response 250, and determines the correct port that the second response 255 should be transmitted over. In the illustrated example, the proxy 165 determines the port that the second response should be transmitted over by associating the first response 250 with the first request 235 via the second request 245. In such an example, the proxy 165 can identify that the first request 235 originated on port 80, and thus, the second response should be transmitted on port 80. However, any other method of determining the port to transmit the second response over may additionally or alternatively be used. Further, the response may be transmitted over a port other than the port assigned to the mobile device 205.

Figure 3:
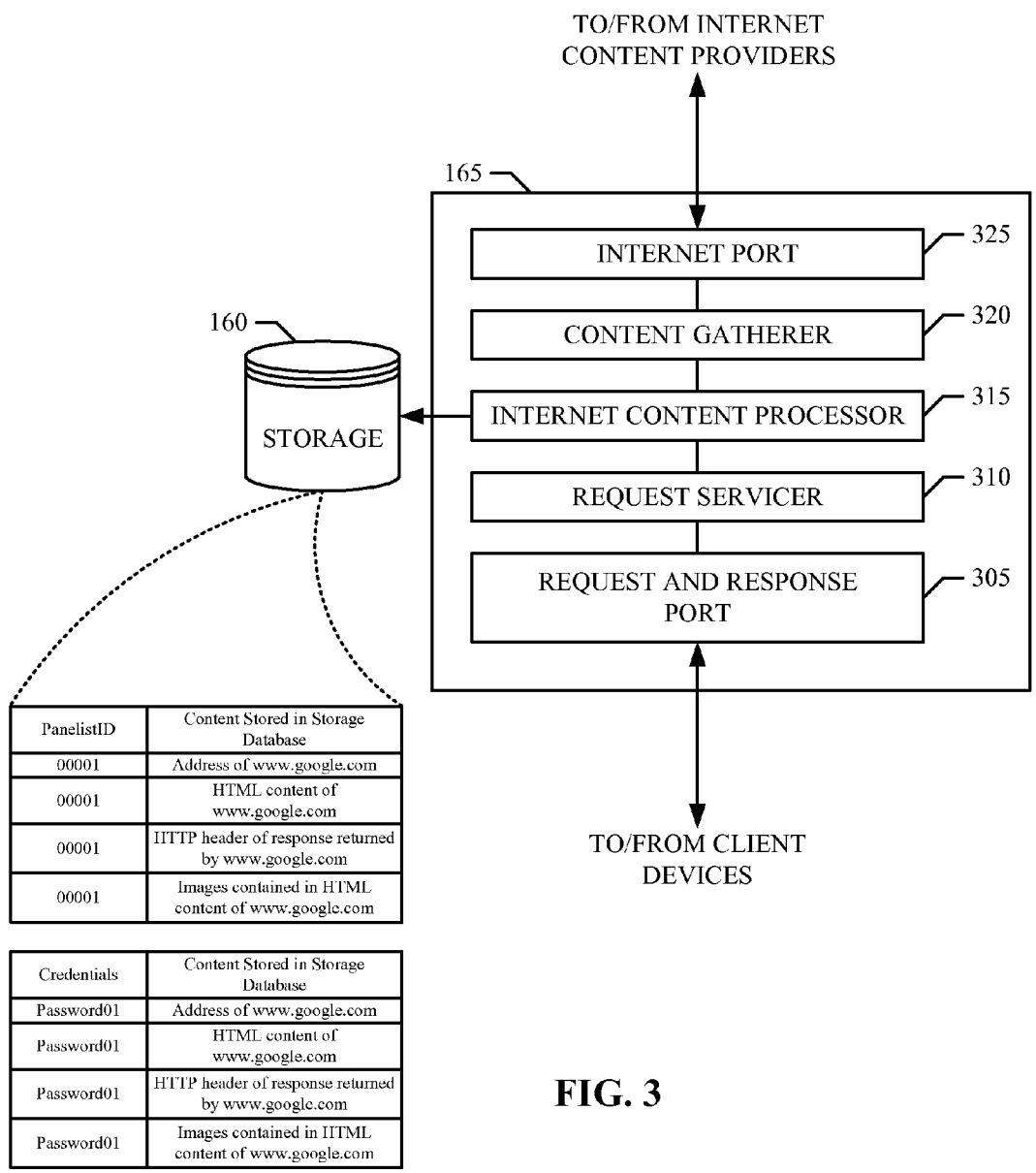
FIG. 3 is a block diagram of the example proxy of FIG. 1.

FIG. 3 is a block diagram of the example proxy 165 of FIG. 1. The example proxy 165 includes a request and response port 305, a request servicer 310, an Internet content processor 315, a content gatherer 320, and an Internet port 325. The request and response port 305 receives requests and transmit responses to and/or from the client devices 110, 130. The requests received by the port 305 are passed to the request servicer 310. The content gatherer 320 transmits requests and receives responses from the Internet content providers 170 via the Internet port 325. The Internet content processor 315 stores the requests (or portions thereof) and/or the retrieved content (or portions thereof or identifiers associated therewith) in the storage database 160.

The request and response port 305 of the illustrated example is a Transmission Control Protocol (TCP) port and/or a User Datagram Protocol (UDP) port. However, any other port-based system may additionally or alternatively be used. The request and response port of the illustrated example is port 80, as port 80 is typically used for HTTP content and is not typically blocked by most firewalls. However, the port may be any other port number such as, for example, a port within the Well Defined Ports range (ranging from port 0 to port 1023) and/or a port within the Registered Ports range (ranging from port 1024 to port 49151).

The request servicer 310 of the illustrated example receives the requests from the request and response port 305 and performs a port translation if necessary. A port translation may not be necessary in the event that the proxy is hosted via the same port that the requested content is hosted on. For example, if the proxy is hosted on port 80 and the content request is for content provided on port 80 (e.g., HTTP content), no port translation would occur. First, the request is inspected to determine the destination port that is intended for communication with the Internet content provider 170. For example, in many situations, the request will be for HTTP content and the destination port will be identified as port 80. However, any other destination port may be employed. For example, FTP traffic may be translated to port 21. The content gatherer 320 is responsible for gathering the content identified in the request (e.g., by sending translated requests to the corresponding content provider). Once the content is gathered, the request servicer 310 performs another port translation on the received content response to generate a translated response and to send the translated response to the client device over the port assigned to the client device that made the request.

In addition to translating the port of the request for Internet content, the request servicer inspects the user agent identifier of the request. If the user agent identifier identifies an application that supports authentication, the request servicer 305 determines if valid credentials are provided with the request. If valid credentials are not provided, the request servicer 305 requests credentials from the client device. If valid credentials are provided, the request servicer 305 provides the request to the content gatherer 320.

The Internet content processor 315 of the illustrated example determines the credentials associated with the request if available, and stores the request in the storage database 160 in association with the credentials to uniquely identify the client device. In some situations, credentials may not be available for storing. For example, when the user agent indicates that the application requesting Internet content does not support proxy authentication, no credentials are requested. Therefore, some of the content requests stored in the storage database 160 may not uniquely identify the originating client device 110, 130 and/or alternatively, the Internet content processor 315 may use the credentials to determine and store the panelist ID and/or the client device ID that was generated by the registrar 155 upon registration. In the illustrated example, the Internet content processor 315 stores the request for content. However, the Internet content processor 315 may store less than the entire request, a symbol for the request, etc., as shown in the tables of FIG. 3. Additionally or alternatively, the Internet content processor 315 may store the content provided in the response and/or segments and/or portions of the content provided in the response in the storage database 160. For example, the Internet content processor 315 may store advertisements transmitted to the client device in the storage database 160.

The content gatherer 320 of the illustrated example requests the content identified by the request for Internet content. In particular, the content gatherer 320 utilizes the Internet address of the content requested in the request via one of the ports 305 to generate a second request to gather the requested Internet content. The content gatherer 320 transmits the second request via the Internet port 325. The Internet port 325 of the illustrated example is a Transmission Control Protocol (TCP) port and/or a User Datagram Protocol (UDP) port. However, any other port-based system may additionally or alternatively be used. The Internet port of the illustrated example is for HTTP traffic (e.g., port 80). However, any other port may be used. For example, port 21 could be used for File Transfer Protocol (FTP) traffic.

FIG. 4 is an example Hypertext Transfer Protocol (HTTP) request 400 as received by the example proxy 165 of FIGS. 1, 2, and 3. The example HTTP request 400 comprises a user agent identifier 405. In the illustrated example, the HTTP request 400 is a GET request for www.google.com, as identified by the first and second lines. Further, the user agent identifier 405 identifies Apple® Safari®, a browser application of the Apple® iPhone®, as the requesting application. However, any other application may request Internet content and be identified by the user agent identifier 405. In the illustrated example, version identifiers of the user agent identifier 405 suggest that the version of Apple® Safari® transmitting the request is an application for the Apple® iPhone®; and further, that version 6789 of Apple® Safari® is transmitting the request. In another example, an application accessing Internet content, such as a weather application may transmit a user agent identifier 405 suggesting that the application transmitting the request is the weather application.

While an example manner of implementing the proxy 165 of FIG. 1 has been illustrated in FIGS. 1 and 3, one or more of the elements, processes, and/or devices illustrated in FIG. 3 may be combined, divided, re-arranged, omitted, eliminated, and/or implemented in any other way. Further, the request and response ports 305, the request servicer 310, the Internet content processor 315, the content gatherer 320, the Internet port 325 and/or, more generally, the example proxy 165 of FIG. 3 and/or the example registrar 155 of FIG. 1 may be implemented by hardware, software, firmware, and/or any combination of hardware, software, and/or firmware. Thus, for example, any of the example request and response ports 305, the example request servicer 310, the example Internet content processor 315, the example content gatherer 320, the example Internet port 325 and/or, more generally, the example proxy 165 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example request and response ports 305, the example request servicer 310, the example Internet content processor 315, the example content gatherer 320, the example Internet port 325, the example proxy 165, the example registrar 155, and/or the storage database 160 are hereby expressly defined to include hardware and/or a computer readable medium such as a memory, DVD, CD, etc. storing the software and/or firmware. Further still, the example proxy 165 of FIGS. 1 and 3 may include one or more elements, processes, and/or devices in addition to, or instead of, those illustrated in FIG. 3, and/or may include more than one of any or all of the illustrated elements, processes, and devices.

Figure 5:
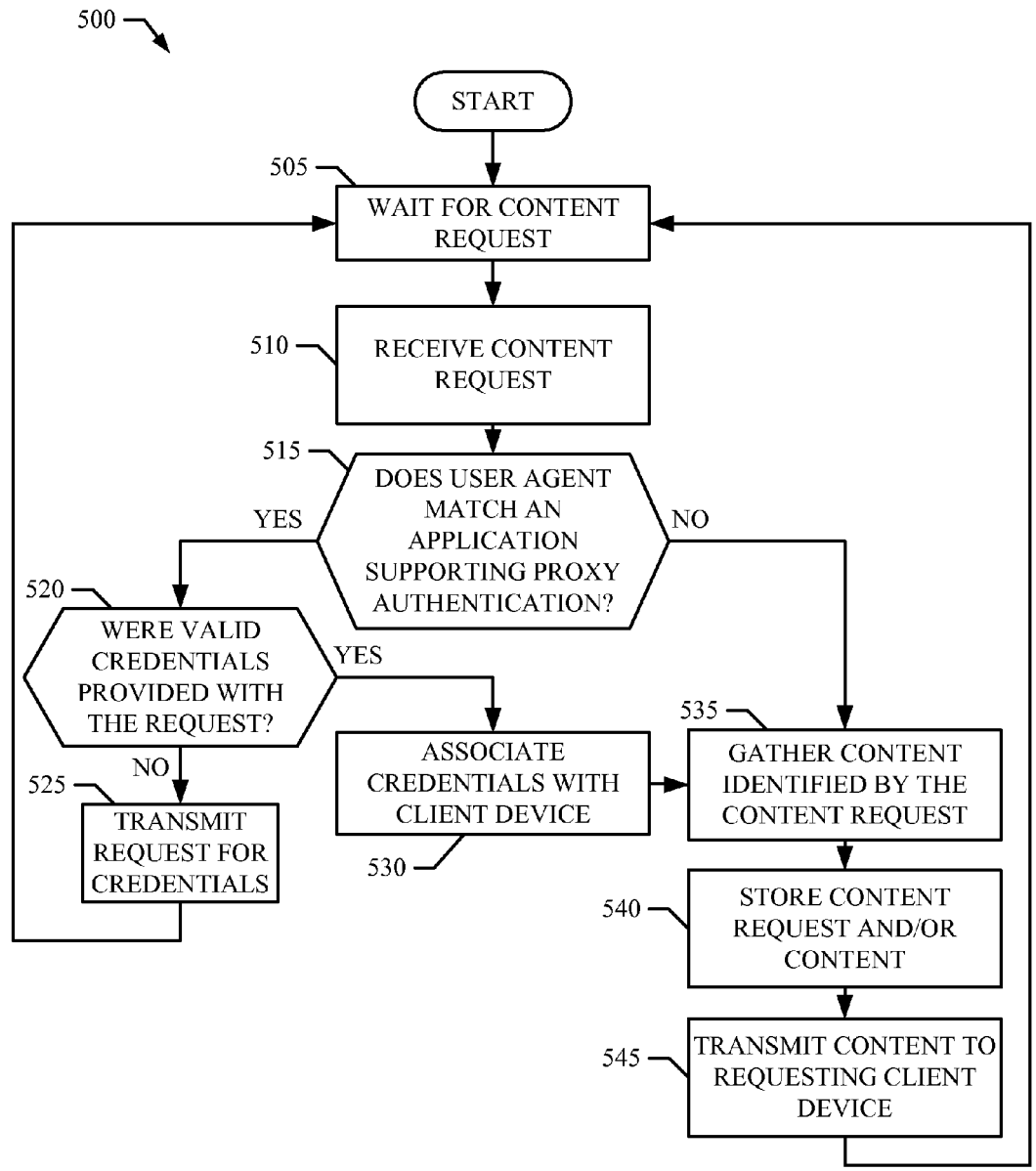
FIGS. 5 and 5A are flowcharts representative of example machine-readable instructions that may be executed to implement the example proxy of FIGS. 1, 2, and 3.
Figure 5A:
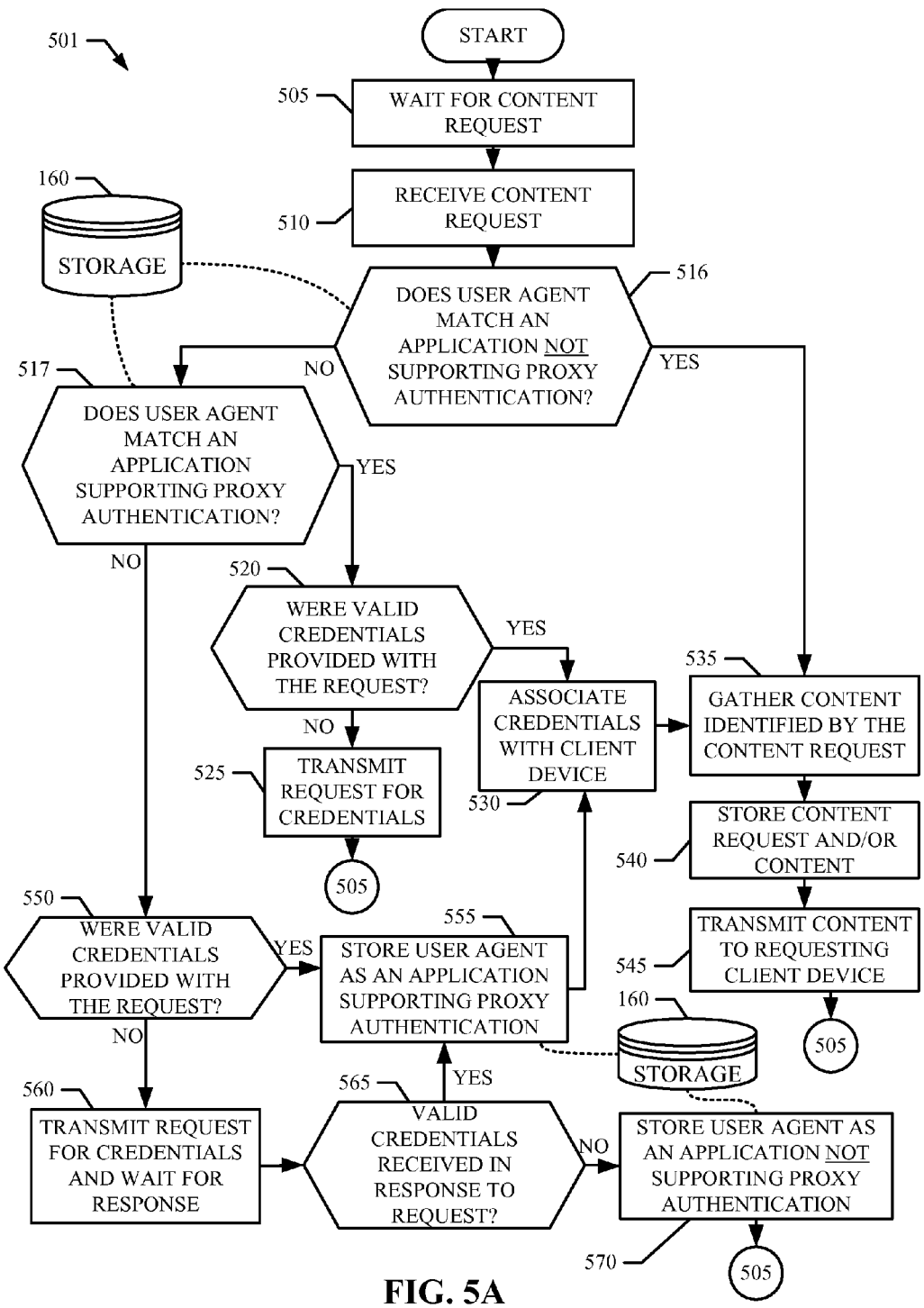

A flowchart representative of example machine-readable instructions for implementing the proxy 165 of FIGS. 1 and/or 3 is shown in FIGS. 5 and 5A. Further, a flowchart representative of example machine-readable instructions for implementing the registrar 155 of FIG. 1 is shown in FIG.

6. In these examples, the machine-readable instructions comprise program(s) for execution by a processor such as the processor 712 shown in the example computer 700 discussed below in connection with FIG. 7. The program may be embodied in software stored on a computer readable medium such as a CD-ROM, a floppy disk, a hard drive, a digital versatile disk (DVD), or a memory associated with the processor 712, but the entire program(s) and/or parts thereof could alternatively be executed by a device other than the processor 712 and/or embodied in firmware or dedicated hardware. Further, although the example program(s) are described with reference to the flowcharts illustrated in FIGS. 5, 5A, and 6, many other methods of implementing the example proxy 165 and/or the example registrar 155 may alternatively be used. For example, the order of execution of the blocks may be changed, and/or some of the blocks described may be changed, eliminated, or combined.

As mentioned above, the example processes of FIGS. 5, 5A, and 6 may be implemented using coded instructions (e.g., computer-readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer readable storage and to exclude propagating signals. Additionally or alternatively, the example processes of FIGS. 5, 5A, and 6 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals.

FIG. 5 is a flowchart representative of example machine-readable instructions 500 that may be executed to implement the example proxy of FIGS. 1, 2, and 3. The program of FIG. 5 begins at block 505, where the example machine-readable instructions 500 begin execution. First, the request servicer 310 of the proxy 165 waits for content requests (block 505). In the illustrated example, the request servicer 310 waits for content requests only on port 80. However, the request servicer 310 may wait for content requests on any other port, or the request servicer 310 may wait for content requests on multiple ports. Next, the request servicer 310 receives a content request (block 510). Since multiple requests for content may be received at substantially the same time, the content requests may be processed in parallel to decrease the amount of time taken to respond to requests. However, the content requests may be processed in any other manner. For example, the content requests may be processed serially.

The request servicer 310 then determines if the user agent identifier identifies an application supporting authentication (block 515). In the illustrated example, a predefined set of patterns identifying applications supporting authentication are stored in the storage database 160. For example, upon the release of a new version of an application, a new user agent identifier may identify the version of the application requesting Internet content. To properly identify applications that that respond to requests for authentication, the user agent is matched against applications where the authentication capabilities are known. For example, if a new version of a browser application is released and includes a new user agent identifier, the user agent identifier of previous versions of the browser application may substantially match the user agent identifier of the new version. If the previous version of the browser application supported authentication, it is likely that the next version will also support authentication, and therefore authentication credentials are required. An example user agent pattern is "safari", and any user agent identifier that contains the term "safari" will be subject to authentication. However, any other pattern or set of patterns may additionally or alternatively be used. In the illustrated example, the patterns are updated by an administrator. However, as discussed in conjunction with FIG. 5A, an automated pattern generating system may additionally or alternatively be used.

The request servicer 310 attempts to match the user agent identifier against the predefined patterns, and if a pattern is found that substantially matches the user agent identifier, the request servicer 310 proceeds to determine if credentials were associated with the request (block 520). If valid credentials were not associated with the request, the request servicer 310 transmits a request for valid credentials to the client device 110, 130 (block 525). The request for credentials may prompt the panelist and/or client device to re-transmit the previous request with valid credentials. If valid credentials were associated with the request, the credentials are associated with the panelist and/or client device (block 530).

Next, the content gatherer 320 generates second request(s) based on corresponding ones of the request received at block 510, to retrieve the Internet content identified in the corresponding content requests (block 535). The content gatherer 320 gathers the requested Internet content by sending the second requests via the Internet port 325. In the illustrated example, port 80 is used for sending requests. However, any other port may additionally or alternatively be used.

The Internet content processor 315 also associates the content requests with the corresponding requesting device and stores the association in the storage database 160 (block 540). In the illustrated example, the Internet content processor 315 associates the content request with the client device via the credentials associated with the request. In some situations, the application requesting Internet content may not support proxy authentication and/or credentials. In those instances, the content request is stored in the storage database without the associated credentials. Additionally, the Internet content processor 315 may store the returned content or a portion of the returned content in the storage database 160 (block 540). For example, the Internet content processor 315 may store images contained in the returned content.

The Internet content processor 315 may filter what is stored in the storage database. For example, the Internet content processor 315 may only store content requests that request HTTP content, as requests for non-HTTP content may not be parsed properly when analyzing the information. As another example, the Internet content processor 315 may omit style content (e.g., cascading style sheet (CSS) documents) from being stored in the storage database 160, as style content may be of limited use when analyzing the information.

The request servicer 310 finishes servicing the request from the client device by transmitting the requested Internet content to the client device via the port on which the content request was received (blocks 545). Control returns to block 505, where the request servicer 310 waits for more content requests (block 505).

FIG. 5A is a flowchart representative of example machine-readable instructions 501 that may be executed to implement the example proxy of FIGS. 1, 2, and 3. The example machine-readable instructions 501 of FIG. 5A are similar to the machine-readable instructions 500 of FIG. 5. However, where in FIG. 5, block 515 determines whether a user agent identifier matches a single list of patterns representing applications that support authentication, a more complex algorithm may additionally or alternatively be used. In the illustrated example of FIG. 5A, the request servicer 310 waits for content requests (block 505), and receives a content request (block 510). In the illustrated example of FIG. 5A, the request servicer 310 determines if the user agent identifier matches an application not supporting proxy authentication (block 516). The request servicer 310 may consult a pattern or set of patterns stored in the storage database 160. If the request servicer determines that the application does not support proxy authentication, control proceeds to block 535 where the machine-readable instructions 501 proceed in a fashion similar to FIG. 5. If the request servicer 310 determines that the user agent identifier does not match a pattern or set of patterns identifying applications not supporting proxy authentication, the request servicer 310 determines if the user agent identifier matches an application supporting proxy authentication (block 517). Since new applications accessing Internet content are created every day, new user agent identifiers are constantly being introduced. It is unlikely that at any given time a single list exists that can identify proxy authentication support based solely on the user agent identifier. Therefore, the two pattern or set of patterns method identifies proxy authentication support for known user agent identifiers. If the request servicer 310 determines that the application accessing Internet content does support proxy authentication, control proceeds to block 520, where the machine-readable instructions 501 complete execution in a manner similar to the machine-readable instructions 500 of FIG. 5.

If the user agent identifier is not identified by either block 516 or block 517, control proceeds to block 550, where the request servicer 310 determines if valid credentials were provided with the request (block 550). If credentials were provided, then the application supports proxy authentication, and a pattern is created and stored in the storage database 160. Subsequent requests including that particular user agent identifier will then be identified to support proxy authentication. Control then proceeds to block 530, where the machine-readable instructions 501 complete execution in a manner similar to the machine-readable instructions 500 of FIG. 5. If valid credentials were not provided with the request, the request servicer 310 transmits a request for credentials and waits for a response (block 560). The request servicer may wait a short period of time (e.g., 30 seconds, 1 minute, 3 minutes, etc.), as the panelist may be prompted to enter their credentials. The request servicer 310 then determines if credentials were received in response to the request for credentials (block 565). If credentials were received in response to the request for credentials, then the application supports credentials and control proceeds to block 535, where the request servicer 310 stores a pattern in the storage database 160 that causes subsequent requests from that particular user agent to be identified as originating from an application that supports proxy authentication. If no response is received, it is likely that the application crashed or otherwise malfunctioned, and the request servicer 310 stores a pattern in the storage database 160 indicating that the application does not support proxy authentication (block 570). Thus, subsequent requests originating from that particular application are not required to provide authentication credentials. Control then proceeds to block 505, where the request servicer 310 waits for a content request. Thus, when a new user agent identifier is discovered, proxy authentication is attempted in order to determine whether the user agent identifier identifies an application supporting proxy authentication.

In addition to the example two pattern or set of patterns method shown in FIG. 5A, any other type of list may be implemented to control Internet communications through the proxy 165. For example, if a user outside of the panel was attempting to use the proxy 165 (e.g., to maliciously to influence results, to redirect their internet traffic, etc.), a blocking list may be implemented to block users having certain IP addresses. Additionally or alternatively, other blocking lists may be implemented. For example, a list of user agents that are not supported by the proxy may be implemented to prevent Internet communications from desktop browsing applications. In particular, users of the proxy 165 (whether a panelist or not) may configure a browser running on a desktop computer to use the proxy 165. To prevent Internet activity from the browser running on the desktop from affecting the results of the monitoring system, the proxy 165 may block Internet content requests when the user agent identifier matches a user agent identifier in a list of blocked user agents.

Figure 6:
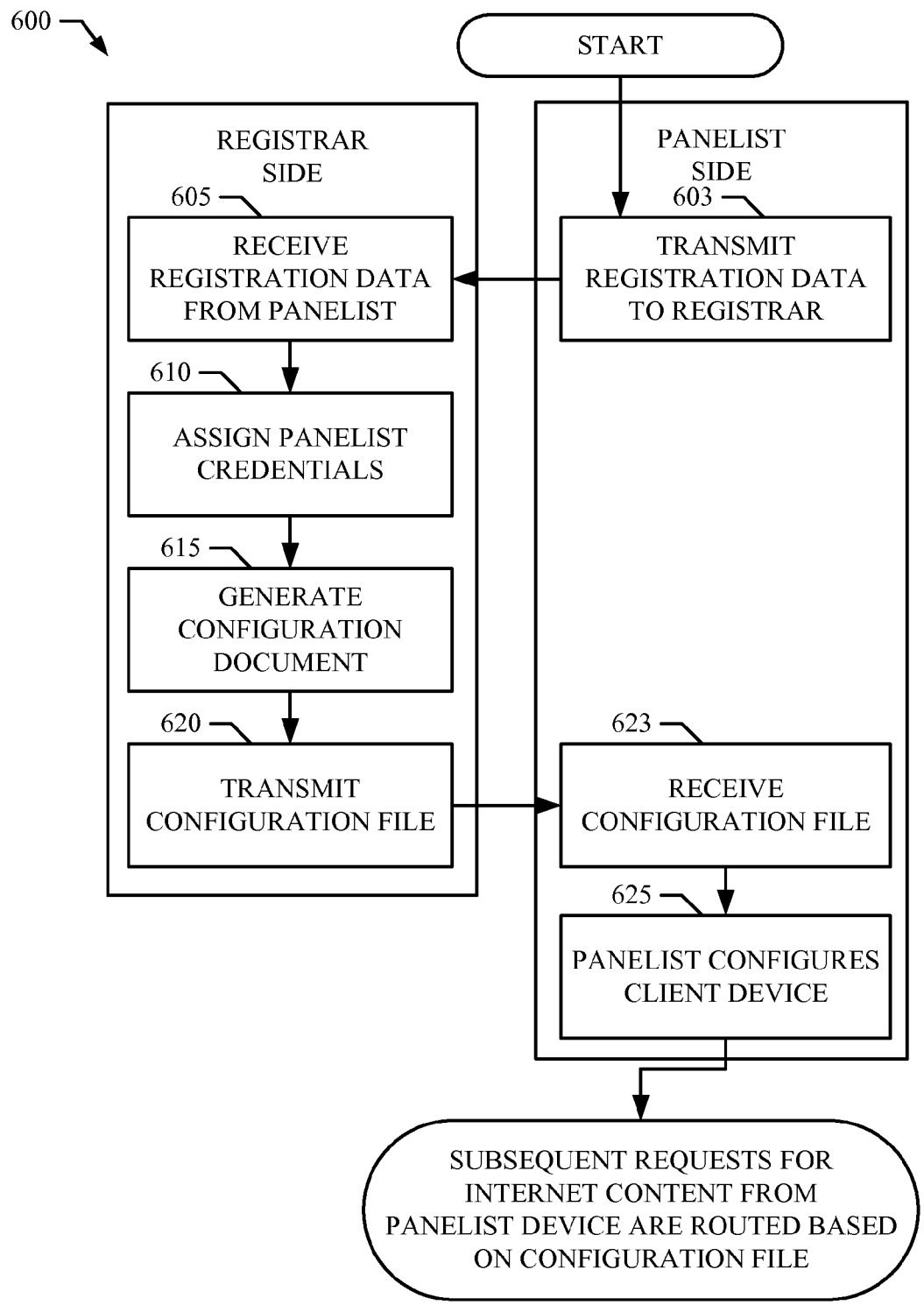
FIG. 6 is a flowchart representative of example machine-readable instructions that may be executed to implement the example registrar of FIG. 1.

FIG. 6 is a flowchart representative of example machine-readable instructions 600 that may be executed to implement the example registrar 155 of FIG. 1. The example machine-readable instructions 600 of FIG. 6 begin execution at block 603, where the panelist 115, 135 submits registration data to the registrar 155 (block 603). In the illustrated example, the registration data is received by the registrar 155 (block 605) via an electronic interface (e.g., a website). However, the registrar may receive the registration data in any other way. For example, the registrar may receive the registration data via a telephone interface, direct mailings, predefined lists, etc.

Next, the registrar 155 assigns the panelist credentials (block 610). In the illustrated example, the panelist enters their desired credentials upon registering for the panel. The credentials of some examples are a username and password. If some or all of the desired credentials (e.g., the username) are unique to the panelist (e.g., the username is not already associated with another panelist in the panel), the credentials are associated with the panelist. The credentials are then transmitted to the panelist via the configuration document. Alternatively, the credentials may be randomly assigned to the panelist. For example, the username may be a first initial of the panelist followed by a last name of the panelist, and the password may be a random string of characters. Further, the panelist may be able to change their password by contacting the registrar 155 (e.g., by accessing a webpage hosted by the registrar 155).

The registrar 155 generates a configuration document (block 615). The configuration document includes the credentials assigned to the client device of the panelist, and an Internet proxy address. The Internet proxy address is the address of the proxy 165. In the illustrated example, the configuration document is an instruction document that instructs the panelist on how to configure the client device, and is formatted as an email message transmitted to the panelist. However, any other type of document may be generated such as, for example, a comma separated (CSV) document, a portable document format (PDF) document, a Microsoft® Word® document, etc.

Next, the registrar 155 transmits the configuration document to the client device (block 620). In the illustrated example, the configuration document is transmitted via an electronic mail (email) message. The email message includes a hyperlink that may be selected to download the configuration document. However, any other methods of transmitting the configuration document may additionally or alternatively be used. For example, the configuration document may be transmitted as an attachment to the email message, the registrar 155 may transmit a short message service (SMS) message comprising an Internet address where the client device may download the configuration document, a direct mailing may be sent to the panelist comprising the instruction document and/or additionally comprising an electronic medium containing the configuration document, a telephone call may be placed to orally instruct the panelist on how to configure the client device, etc. The panelist and/or client device then receive the configuration document (block 623)

The client device 110, 130 is then configured by the panelist (block 625). Since the configuration document is an instruction document that may guide the panelist on how to configure the client device, the panelist may then configure the client device with the credentials, Internet proxy address, and proxy port as defined in the configuration document. The instruction document may thereby instruct the panelist on how to apply the configuration file or may instruct the panelist on how to manually apply the data in the configuration file. However, the configuration file may additionally or alternatively comprise an electronic document that may be interpreted by the client device. As such, instructions may be provided to the panelist regarding how to apply the electronic configuration file.

Upon application of the data contained in the configuration document, subsequent requests for Internet content made by the client device 110, 130 are routed according to the configuration document. In particular, since the configuration document includes the Internet proxy address, the proxy port number, and the credentials, requests are proxied through the Internet proxy address via the proxy port number, and use the credentials for application supporting credentials.

Figure 7:
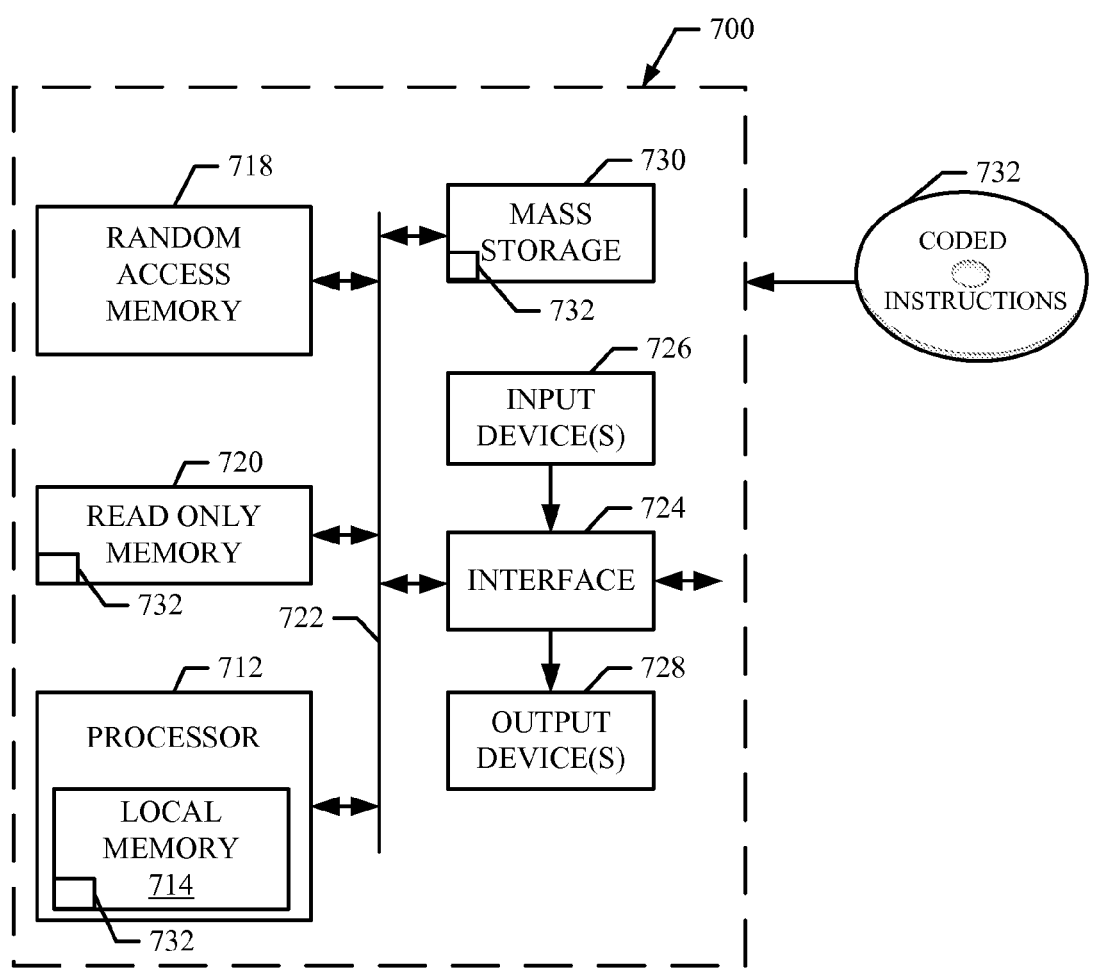
FIG. 7 is a block diagram of an example computer that may execute, for example, the machine-readable instructions of FIGS. 5, 5A, and/or 6 to implement the example monitor of FIGS. 1, 2, and 3, and/or the example registrar of FIG. 1.

FIG. 7 is a block diagram of an example computer 700 capable of executing the instructions of FIGS. 5 and 6 to implement the monitoring system of FIG. 1. The computer 700 can be, for example, a server, a personal computer, or any other type of computing device.

The system 700 of the instant example includes a processor 712. For example, the processor 712 can be implemented by one or more Intel® microprocessors from the Pentium® family, the Itanium® family or the XScale® family. Of course, other processors from other families are also appropriate.

The processor 712 is in communication with a main memory including a volatile memory 718 and a non-volatile memory 720 via a bus 722. The volatile memory 718 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 714 is typically controlled by a memory controller (not shown).

The computer 700 also includes an interface circuit 724. The interface circuit 724 may be implemented by any type of interface standard, such as an Ethernet interface, a universal serial bus (USB), and/or a PCI express interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, isopoint and/or a voice recognition system.

One or more output devices 728 are also connected to the interface circuit 724. The output devices 728 can be implemented, for example, by display devices (e.g., a liquid crystal display, a cathode ray tube display (CRT), a printer and/or speakers). The interface circuit 724, thus, typically includes a graphics driver card.

The interface circuit 724 also includes a communication device (e.g., the request servicer 310) such as a modem or network interface card to facilitate exchange of data with external computers via a network (e.g., an Ethernet connection, a digital subscriber line (DSL), a telephone line, coaxial cable, a cellular telephone system, etc.).

The computer 700 also includes one or more mass storage devices 730 for storing software and data. Examples of such mass storage devices 730 include floppy disk drives, hard drive disks, compact disk drives, and digital versatile disk (DVD) drives. The mass storage device 730 may implement the storage database 160.

The coded instructions 732 of FIGS. 5 and 6 may be stored in the mass storage device 730, in the volatile memory 718, in the non-volatile memory 720, in the local memory 714, and/or on a removable storage medium such as a CD or DVD.

From the foregoing, it will be appreciated that example methods, apparatus and articles of manufacture have been disclosed which allow Internet content requests from any application accessing Internet content on a mobile device via an authenticated proxy to be monitored while uniquely identifying the requesting device and/or panelist when the application accessing Internet content responds to requests for proxy authentication.

Although certain example methods, apparatus, and articles of manufacture have been described herein, the scope of coverage of this patent is not limited thereto. On the contrary, this patent covers all methods, apparatus, and articles of manufacture fairly falling within the scope of the claims of this patent.

What is claimed is:

1. A method to monitor Internet activity of mobile computing devices, the method comprising:

determining, by executing an instruction with a processor, if a media request originated from a desktop computer or a mobile device by inspecting a user agent identifier of the media request;

if the media request originated from the desktop computer, blocking, by executing an instruction with a processor, the media request to prevent the media request originating from the desktop computer from affecting a mobile device media exposure monitoring result; and if the media request originated from the mobile device, storing an identifier of the media requested by the media request in association with the mobile device.

2. The method as defined in claim 1, further including storing a portion of the media in association with an identifier of the mobile device if the media request originated from the mobile device.

3. The method as defined in claim 1, further including, if the media request originated from the mobile device:
determining if an application identified by the user agent identifier supports authentication; and
not requesting authentication credentials if the application does not support authentication.

4. The method as defined in claim 1, further including:
determining if valid credentials are supplied in association with the media request;
transmitting a request for credentials to the mobile device if (1) the user agent identifier substantially matches a pattern of applications that support authentication, (2) valid credentials are not supplied in association with the media request, and (3) the media request originated from the mobile device; and
transmitting media identified by the media request to the mobile device if (1) the user agent identifier substantially matches the pattern of applications that support authentication, (2) valid credentials are supplied in association with the media request, and (3) the media request originated from the mobile device.

5. The method as defined in claim 4, further including determining a panelist identifier associated with the credentials with the identifier of the media request.

6. The method as defined in claim 1, further including instructing the mobile device to transmit media requests via a proxy server.

7. The method as defined in claim 6, further including:
transmitting the credentials and an Internet proxy address of the proxy server to the mobile device; and
causing the mobile device to transmit subsequent requests for media to the proxy server.

8. A proxy server to service media requests from a media device, the proxy server comprising:
a request port to receive a media request;
an Internet port to retrieve media based on the media request;
a request servicer to determine if (1) the media device is a mobile device or a desktop computer, (2) block the media request if the media device is the desktop computer to prevent the media request originating from the desktop computer from affecting a mobile device media monitoring result, and (3) service the media request if the media device is the mobile device; and
a database to store an identification of the media requested via the request port in association with a panelist identifier if the media device is the mobile device.

9. The proxy server as defined in claim 8, wherein:
the request servicer is to determine if (1) a user agent identifier of the media request received by the request port identifies an application which supports proxy authentication, and (2) valid credentials are provided in association with the media request received by the request port; and
the database is to store the identification if (1) the user agent identifier identifies the application that supports proxy authentication, and (2) valid credentials are provided in association with the request.

10. The proxy server as defined in claim 8, further including:
a registrar to register the media device, to uniquely assign credentials to the media device, and to generate a configuration document to transmit the credentials and an Internet proxy address to the media device.

11. The proxy server as defined in claim 10, wherein the registrar is to store an association between the credentials, the panelist identifier, and the media device in the database.

12. The proxy server as defined in claim 8, wherein the request servicer is to store the media request from the media device in the database if the media device is the mobile device but not if the media device is the desktop computer.

13. The proxy server as defined in claim 8, wherein the request servicer is to store the retrieved media transmitted to the media device in the database if the media device is the mobile device but not if the media device is the desktop computer.

14. The proxy server as defined in claim 8, wherein the proxy server is to receive the media request and transmit the requested media via a wireless network.

15. A tangible machine-readable storage medium comprising instructions which, when executed, cause a machine to at least:
examine a user agent identifier of a received media request to determine whether the media request originated from a desktop computer or a mobile device;
if the media request originated from the desktop computer, block the media request to prevent the media request originating from the desktop computer from affecting a mobile device media monitoring result; and
if the media request originated from the mobile device, store an identifier of the media requested by the media request in association with the mobile device.

16. The tangible machine readable storage medium as defined in claim 15, wherein the instructions, when executed, cause the machine to store a portion of the media in association with an identifier of the mobile device if the media request originated from the mobile device.

17. The tangible machine readable storage medium as defined in claim 15, wherein the instructions, when executed, cause the machine to, if the media request originated from the mobile device:
determine if an application identified by the application identifier supports authentication; and
not request authentication credentials if the application does not support authentication.

18. The tangible machine readable storage medium as defined in claim 15, wherein the instructions, when executed, cause the machine to:
determine if valid credentials are supplied in association with the media request;
transmit a request for credentials to the mobile device if (1) the user agent identifier substantially matches a pattern of applications that support authentication, (2) valid credentials are not supplied in association with the media request, and (3) the media request originated from the mobile device; and
transmit media identified by the media request to the mobile device if (1) the user agent identifier substantially matches the pattern of applications that support authentication, (2) valid credentials are supplied in association with the media request, and (3) the media request originated from the mobile device.

19. The tangible machine readable storage medium as defined in claim 15, wherein the instructions, when executed, cause the machine to instruct the mobile device to transmit media requests via a proxy server.

20. The tangible machine readable storage medium as defined in claim 19, wherein the instructions, when executed, cause the machine to:

transmit the credentials and an Internet proxy address of the proxy server to the mobile device; and
cause the mobile device to transmit subsequent requests for media to the proxy server.

\* \* \* \* \*